United States Patent
Momoda et al.

(10) Patent No.: US 9,977,161 B2
(45) Date of Patent: *May 22, 2018

(54) CURABLE COMPOSITION, CURED ARTICLE OBTAINED THEREFROM, AND PHOTOCHROMIC OPTICAL MATERIAL AND PROCESS FOR PRODUCING THE SAME

(75) Inventors: Junji Momoda, Shunan (JP); Katsuhiro Mori, Shunan (JP)

(73) Assignee: TOKUYAMA CORPORATION, Shunan-Shi (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 10/484,896

(22) PCT Filed: Mar. 26, 2002

(86) PCT No.: PCT/JP02/02921
§ 371 (c)(1),
(2), (4) Date: Jan. 27, 2004

(87) PCT Pub. No.: WO03/011967
PCT Pub. Date: Feb. 13, 2003

(65) Prior Publication Data
US 2004/0220292 A1 Nov. 4, 2004

(30) Foreign Application Priority Data

Jul. 27, 2001 (JP) ................................ 2001-227374
Sep. 19, 2001 (JP) ................................ 2001-284521

(51) Int. Cl.
| | | |
|---|---|---|
| *G02B 5/23* | (2006.01) | |
| *C09D 4/00* | (2006.01) | |
| *C08G 18/81* | (2006.01) | |
| *C08F 230/08* | (2006.01) | |

(52) U.S. Cl.
CPC ............ *G02B 5/23* (2013.01); *C08G 18/8116* (2013.01); *C09D 4/00* (2013.01)

(58) Field of Classification Search
CPC ........ G02B 5/23; C09D 4/00; C08G 18/8116; C08F 230/08
USPC ..... 359/241; 427/299, 307, 322, 387, 393.5; 428/447; 524/186, 188, 714; 526/279
See application file for complete search history.

(56) References Cited

U.S. PATENT DOCUMENTS

| | | | |
|---|---|---|---|
| 4,913,544 A | | 4/1990 | Rickwood et al. |
| 5,462,806 A | * | 10/1995 | Konishi et al. ............... 428/451 |
| 5,621,017 A | * | 4/1997 | Kobayakawa et al. ......... 522/16 |
| 5,739,243 A | | 4/1998 | Herold et al. |
| 5,914,174 A | | 6/1999 | Gupta et al. |
| 6,118,218 A | * | 9/2000 | Yializis et al. .......... 315/111.21 |
| 6,194,511 B1 | * | 2/2001 | Momoda et al. ............. 524/539 |
| 6,340,765 B1 | * | 1/2002 | Momoda et al. ............. 549/330 |
| 6,362,248 B1 | * | 3/2002 | Hara et al. ...................... 522/26 |
| 6,419,873 B1 | * | 7/2002 | Buazza et al. ................ 264/496 |
| 6,429,595 B1 | * | 8/2002 | Hammen et al. ........ 315/111.21 |
| 6,698,883 B2 | * | 3/2004 | Momoda et al. ............. 351/162 |
| 6,770,692 B1 | * | 8/2004 | Kobayashi et al. ............ 524/91 |
| 6,802,993 B2 | * | 10/2004 | Momoda et al. ............. 252/586 |
| 7,442,734 B2 | * | 10/2008 | Mori et al. .................... 524/107 |
| 7,763,693 B2 | * | 7/2010 | Nagoh et al. ................. 526/319 |

FOREIGN PATENT DOCUMENTS

| | | |
|---|---|---|
| EP | 0 316 179 A2 | 5/1989 |
| EP | 0772060 A2 | 5/1997 |
| EP | 1 130 038 A1 | 9/2001 |
| JP | 62-288830 A | 12/1987 |
| JP | 2-28154 A | 1/1990 |
| JP | 9-221671 A | 8/1997 |
| JP | 2001-75058 * | 3/2001 |
| JP | 2002-105139 A | 4/2002 |
| WO | WO 94/22850 A1 | 1/1994 |
| WO | WO 96/14596 A1 | 5/1996 |
| WO | WO-97/05213 A1 | 2/1997 |
| WO | WO-97/27223 A1 | 7/1997 |
| WO | WO 98/37115 A1 | 8/1998 |
| WO | WO 99/38924 * | 8/1999 |
| WO | WO-0023523 A1 | 4/2000 |
| WO | WO 01/02449 A2 | 1/2001 |
| WO | WO 01/05854 * | 1/2001 |
| WO | WO 01/05854 A1 | 1/2001 |
| WO | WO 01/34707 A1 * | 5/2001 |

* cited by examiner

Primary Examiner — Rabon Sergent
(74) Attorney, Agent, or Firm — Birch, Stewart, Kolasch & Birch, LLP

(57) ABSTRACT

A curable composition which provides a coating layer having high adhesion to a substrate and a hard coat layer and extremely excellent photochromic properties such as high color development intensity, high fading speed and excellent durability. This composition comprises (1) 100 parts by weight of radically polymerizable monomers including a silyl monomer such as γ-methacryloyloxypropyl trimethoxysilane and/or an isocyanate monomer such as 2-isocyanatoethoxy methacrylate, (2) 0.01 to 20 parts by weight of an amine compound and (3) 0.01 to 20 parts by weight of a photochromic compound. A photochromic optical material having excellent adhesion between a photochromic coating layer and a resin substrate and obtained by using this composition as a coating material and a process for producing the photochromic optical material.

16 Claims, No Drawings

CURABLE COMPOSITION, CURED ARTICLE OBTAINED THEREFROM, AND PHOTOCHROMIC OPTICAL MATERIAL AND PROCESS FOR PRODUCING THE SAME

This application is the national phase under 35 U.S.C. § 371 of PCT International Application No. PCT/JP02/02921 which has an International filing date of Mar. 26, 2002, which designated the United States of America. This application also claims priority of Application No. 2001-227374 filed in Japan on Jul. 27, 2001, and Application No. 2001-284521 filed in Japan on Sep. 19, 2001 under 35 U.S.C. § 119, which are herein incorporated by reference.

FIELD OF THE INVENTION

The present invention relates to a curable composition having photochromic properties, a cured product obtained by curing this curable composition, a photochromic optical material obtained by curing this curable composition on a substrate and a process for producing this optical material. More specifically, it relates to a photochromic curable composition which can be advantageously used as a coating material capable of easily providing photochromic properties to an optical material such as a spectacle lens by applying the composition to the surface of the optical material, a cured product thereof, an optical material having the cured product as a coating film and a process for producing the optical material.

DESCRIPTION OF THE PRIOR ART

Photochromic properties is a reversible phenomenon that a certain compound changes its color immediately upon exposure to light including ultraviolet rays, such as sunlight or light from a mercury lamp and returns to its original color when it is placed in the dark by stopping exposure and is now applied in various fields.

For example, photochromic properties is applied in the field of spectacle lenses. A plastic lens having photochromic properties is obtained by curing a polymerizable monomer containing with a photochromic compound having the above property. Fulgimide compounds, spirooxazine compounds, chromene compounds and the like have been discovered as photochromic compounds which can be advantageously used in the above field.

As the production process of plastic lenses having photochromic properties, there are proposed a method in which the surface of a lens having no photochromic properties is imbibed with a photochromic compound (to be referred to as "imbibition method" hereinafter), a method in which a primer layer or hard coat layer having photochromic properties is formed on the surface of a lens (to be referred to as "coating method" hereinafter), and a method in which a photochromic properties compound is dissolved in a monomer and the resulting solution is polymerized to obtain a photochromic lens directly (to be referred to as "in mass method" hereinafter).

However, in order to obtain excellent photochromic properties by the in mass method or imbibition method, a lens substrate must be designed to obtain excellent photochromic properties. As its design guideline, it is conceivable that the glass transition temperature (Tg) of the lens substrate is reduced to facilitate the mobility of a photochromic molecule even in a macromolecule or that a free space in a macromolecule is widened to facilitate the mobility of a photochromic molecule. U.S. Pat. No. 5,739,243 discloses a combination of a specific long-chain alkylene glycol dimethacrylate and a polyfunctional methacrylate having three or more radically polymerizable groups. A cured product whose color development intensity and fading speed are improved to a certain extent is obtained from the combination. However, as this technology reduces Tg of a substrate to improve photochromic properties and imbibition properties, the flexibility of the substrate becomes too high, thereby reducing the hardness and heat resistance of the substrate and causing a new problem that there exists a lot of optical strain.

The inventors of the present invention have proposed a curable composition which overcomes the above defects (PCT International Application No. 01/05854). The curable composition comprises a combination of a commonly used polymerizable monomer and a polyfunctional polymerizable monomer having at least three polymerizable groups as radically polymerizable monomers to obtain excellent photochromic properties and substrate characteristic properties. However, further improved physical properties are now required for photochromic lenses.

In contrast to this, as the coating method provides photochromic properties to the surface of a lens, this method has possibility to satisfy requirements for both substrate characteristic properties and photochromic properties. WO98/37115 proposes a method in which a solution of a photochromic compound dissolved in an urethane oligomer is applied to the surface of a lens and cured. However, the resin obtained by curing the urethane oligomer has such defects as low crosslinking density, large dependence of photochromic properties on temperature and the dissolution of a photochromic compound into a hard coat solution when a hard coat layer is to be formed on the photochromic coating layer.

U.S. Pat. No. 5,914,174 proposes that a photochromic compound is dissolved in a polymerizable monomer composition comprising monofunctional, bifunctional and polyfunctional radically polymerizable monomers and that the obtained solution is applied to the surface of a lens and cured.

Further, WO01/02449 proposes that a photochromic compound is dissolved in a monomer composition consisting of two or more bifunctional (meth)acrylic monomers and that the obtained solution is applied to the surface of a lens and cured.

However, the coating method using these compositions has such a defect that adhesion between a spectacle lens and a photochromic coating layer is unsatisfactory or poor.

WO01/05854 proposes that a radically polymerizable monomer containing a photochromic compound is poured into a gap between a plastic lens held by an elastomer gasket or spacer and a glass mold and cured by polymerization. This two-stage polymerized or laminated lens has been studied but adhesion between the plastic lens and the photochromic layer is unsatisfactory and it cannot be said that the lens can be put to practical use.

Although there is proposed the coating method for obtaining both photochromic properties and substrate characteristic properties as described above, an example in which all the requirements are satisfied at the same time from a practical point of view has not been seen hitherto.

SUMMARY OF THE INVENTION

It is an object of the present invention to provide a curable composition which can provide a photochromic properties cured product having excellent photochromic properties, such as high color development intensity and high fading speed, and excellent adhesion to a substrate, is free from the dissolution of a photochromic compound and further having excellent durability against a hard coat.

It is another object of the present invention to provide a photochromic cured product having the above characteristic properties.

It is still another object of the present invention to provide a photochromic optical material having the photochromic cured product of the present invention on a substrate.

It is a further object of the present invention to provide a process for producing a photochromic cured product, which can provide a photochromic cured product having excellent adhesion to a substrate.

Other objects and advantages of the present invention will be obvious from the following description.

According to the present invention, firstly, the above objects and advantages of the present invention are attained by a curable composition comprising:
(1) 100 parts by weight of radically polymerizable monomers;
(2) 0.01 to 20 parts by weight of an amine compound; and
(3) 0.01 to 20 parts by weight of a photochromic compound,
the radically polymerizable monomers including a radically polymerizable monomer having a silanol group or a group which forms a silanol group by hydrolysis, and/or a radically polymerizable monomer having an isocyanate group.

According to the present invention, secondly, the above objects and advantages of the present invention are attained by a photochromic cured product obtained by curing the curable composition of the present invention.

According to the present invention, thirdly, the above objects and advantages of the present invention are attained by a photochromic optical material comprising a substrate having at least one surface coated with a cured product of the curable composition of the present invention.

According to the present invention, fourthly, the above objects and advantages of the present invention are attained by a process for producing a photochromic optical material comprising a substrate having at least one coated surface, the process comprising curing a thin film of the curable composition of the present invention formed on at least one surface of the substrate by light or both light and heat.

According to the present invention, finally, the above objects and advantages of the present invention are attained by a process for producing a photochromic optical material, comprising subjecting at least one surface of a resin substrate to an atmospheric plasma treatment, coating the plasma treated surface with a curable coating composition containing a photochromic compound, and curing the coating layer.

DETAILED DESCRIPTION OF THE PREFERRED EMBODIMENT

A description is first given of the curable composition of the present invention and then of other objects of the present invention.

In the present invention, to increase adhesion between a cured product of the curable composition and a substrate such as a spectacle lens, a radically polymerizable monomer having a silanol group or a group which forms a silanol group by hydrolysis (may be referred to as "silyl monomer" hereinafter) or a radically polymerizable monomer having an isocyanate group (may be referred to as "isocyanate monomer" hereinafter) is used.

Any known compound may be used as the silyl monomer if it has a silanol group (≡Si—OH) or a group which forms a silanol group by hydrolysis and a radically polymerizable group.

Illustrative examples of the group which forms a silanol group by hydrolysis include alkoxysilyl group (≡Si—O—R; R is an alkyl group), aryloxysilyl group (≡Si—O—Ar; Ar is an aryl group which may be substituted), halosilyl group (≡Si—X; X is a halogen atom) and silyloxysilyl group (disiloxane bond; ≡Si—O—Si≡).

Out of these groups which form a silanol group by hydrolysis, alkoxysilyl group or silyloxysilyl group is preferred, alkoxysilyl group having an alkoxyl group with 1 to 4 carbon atoms is more preferred, and methoxysilyl group or ethoxysilyl group is the most preferred because it easily forms a silanol group and is easily synthesized and kept and a group eliminated from a silicon atom by a reaction has little influence upon the physical properties of the cured product.

Examples of the radically polymerizable group include known radically polymerizable groups exemplified by (meth)acryloyl group, (meth)acryloyl group derivatives such as (meth)acryloyloxy group, (meth)acryloylamino group and (meth)acryloylthio group, vinyl group, allyl group and styryl group. When the radically polymerizable group is a vinyl group, allyl group or styryl group, the radically polymerizable group may have a substituent. Examples of the substituent include alkyl groups and haloalkyl groups having 1 to 4 carbon atoms such as methyl group, ethyl group, propyl group, butyl group, chloromethyl group and trifluoromethyl group, halogen atom, cyano group, nitro group and hydroxyl group. When the radically polymerizable group is a (meth)acryloylamino group, an organic group such as a substituted or nonsubstituted alkyl group, aryl group or allyl group may be bonded to the amidonitrogen atom of the group in addition to (meth)acryloyl group and the above silanol group or group which forms a silanol group by hydrolysis.

Out of these radically polymerizable groups, (meth)acryloyl group or (meth)acryloyloxy group is preferred and (meth)acryloyloxy group is more preferred from the viewpoints of acquisition ease and high polymerizability.

What are preferred as the silyl monomer having a group capable of forming a silanol group by hydrolysis and a radically polymerizable group are represented by the following formulas (1) to (3):

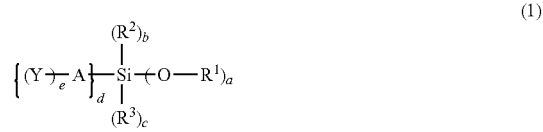

wherein $R^1$ is an alkyl group or aryl group, $R^2$ and $R^3$ are each independently an alkyl group, aryl group or acyl group, A is a divalent to tetravalent organic residual group, Y is a radically polymerizable group, a is an integer of 1 to 3, b is an integer of 0 to 2, c is an integer of 0 to 2, d is an integer of 1 to 3, and e is an integer of 1 to 3, with the proviso that a+b+c+d=4,

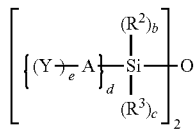 (2)

wherein $R^2$ and $R^3$ are each independently an alkyl group, aryl group or acyl group, A is a divalent to tetravalent organic residual group, Y is a radically polymerizable group, b is an integer of 0 to 2, c is an integer of 0 to 2, d is an integer of 1 to 3, and e is an integer of 1 to 3, with the proviso that b+c+d=3,

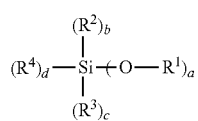 (3)

wherein $R^1$ is an alkyl group or aryl group, $R^2$ and $R^3$ are each independently an alkyl group, aryl group or acyl group, $R^4$ is a vinyl group, a is an integer of 1 to 3, b is an integer of 0 to 2, c is an integer of 0 to 2, and d is an integer of 1 to 3, with the proviso that a+b+c+d=4.

In the above formulas (1) to (3), $R^1$ is an alkyl group or aryl group. It is preferably an alkyl group having 1 to 10 carbon atoms in the main chain or aryl group having 6 to 10 carbon atoms constituting a ring from the viewpoints of ease of forming a silanol group by hydrolysis and keeping stability. The alkyl group or aryl group may have a substituent. Examples of the substituent include alkyl groups having 1 to 10 carbon atoms such as methyl group, ethyl group and propyl group, haloalkyl groups having 1 to 10 carbon atoms such as chloromethyl group and trifluoromethyl group, alkoxyl groups having 1 to 10 carbon atoms such as methoxy group, ethoxy group and butoxy group, acyl groups having 2 to 10 carbon atoms such as acetyl group, propionyl group, oleyl group and benzoyl group, amino group, alkyl-substituted amino groups having 1 to 10 carbon atoms such as methylamino group, ethylamino group, dimethylamino group and diethylamino group, halogen atoms such as fluorine atom, chlorine atom and bromine atom, hydroxyl group, carboxyl group, mercapto group, cyano group and nitro group.

Examples of the substituted or nonsubstituted alkyl group having 1 to 10 carbon atoms in the main chain include methyl group, ethyl group, propyl group, butyl group and chloromethyl group. Examples of the substituted or nonsubstituted aryl group having 6 to 10 carbon atoms constituting a ring include phenyl group, toluyl group and xylyl group.

From the viewpoints of ease of forming a silanol group by hydrolysis and keeping stability, $R^1$ is preferably an alkyl group, more preferably an alkyl group having 1 to 4 carbon atoms, the most preferably methyl group or ethyl group.

$R^2$ and $R^3$ in the above formulas (1) to (3) are each independently an alkyl group, aryl group or acyl group. Examples of the alkyl group and aryl group are the same as those listed for $R^1$ and preferred groups are the same as $R^1$. The acyl group is preferably an acyl group having 2 to 10 carbon atoms. The acyl group may be an aliphatic acyl group or aromatic acyl group. Illustrative examples of the acyl group include acetyl group, propionyl group and benzoyl group.

A in the above formulas (1) and (2) is a divalent to tetravalent organic residual group, preferably a divalent to tetravalent organic residual group having 1 to 30 carbon atoms. The structure of the organic residual group is not particularly limited and may have a side chain or substituent. The organic residual group may have a bond other than a carbon-carbon bond, such as an ether bond, ester bond, amide bond, amino bond, urethane bond, thioether bond or sulfonyl bond in the structure and may further contain an oxa group (ketone carbon). Examples of the substituent of the organic residual group include halogen atoms such as fluorine atom, chlorine atom and bromine atom, hydroxyl group, amino group, mercapto group, cyano group and nitro group.

The organic residual group preferably has 1 to 10 carbon atoms. Specific examples of the organic residual group include alkylene groups having 1 to 10 carbon atoms such as methylene group, ethylene group, propylene group, trimethylene group and butylene group, alkylenedioxy groups having 1 to 10 carbon atoms such as methylenedioxy group, ethylenedioxy group, propylenedioxy group and butylenedioxy group, groups shown below:

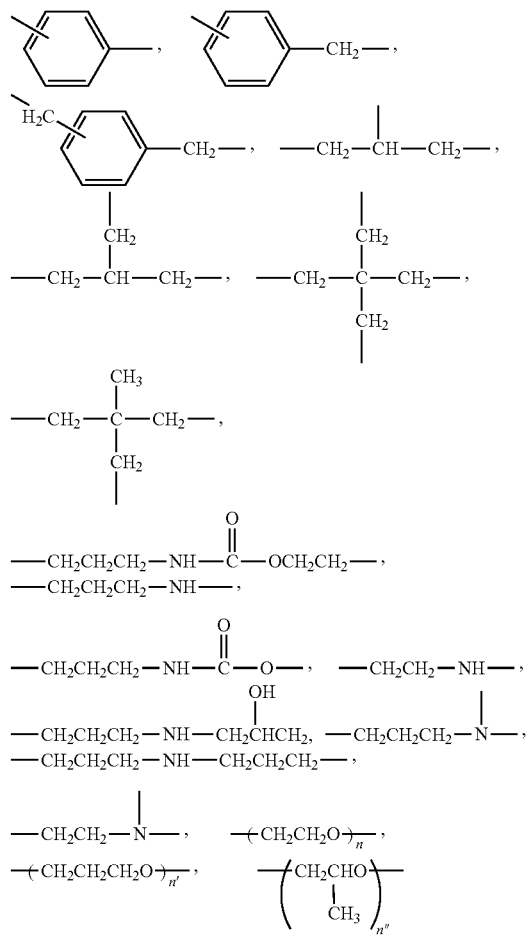

(in the above formulas, n is an integer of 1 to 5, and n' and n" are each an integer of 1 to 3), and groups obtained by substituting these groups by the above substituent.

Y in the formulas (1) and (2) is a radically polymerizable group such as (meth)acryloyl group, (meth)acryloyl group derivative such as (meth)acryloyloxy group, (meth)acryloylamino group or (meth)acryloylthio group, substituted or nonsubstituted vinyl group, substituted or nonsubstituted allyl group, or substituted or nonsubstituted styryl group as described above. Y is preferably a (meth)acryloyl group or (meth)acryloyloxy group.

Out of the silyl monomers represented by the above formulas, a silyl monomer represented by the formula (1) is preferred and a silyl monomer represented by the following formula (4) is particularly preferred:

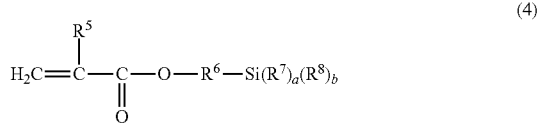

(4)

wherein $R^5$ is a hydrogen atom or methyl group, $R^6$ is an alkylene group having 1 to 10 carbon atoms, $R^7$ is an alkoxyl group having 1 to 4 carbon atoms, $R^8$ is an alkyl group having 1 to 4 carbon atoms, a is an integer of 1 to 3, and b is an integer of 0 to 2, with the proviso that a+b=3.

In the above formula (4), $R^5$ is a hydrogen atom or methyl group, and $R^6$ is an alkylene group having 1 to 10 carbon atoms. Examples of the alkylene group having 1 to 10 carbon atoms in the main chain include ethylene group, propylene group, trimethylene group and butylene group. $R^7$ is an alkoxyl group having 1 to 4 carbon atoms, such as methoxy group, ethoxy group, propoxy group or butoxy group. $R^8$ is an alkyl group having 1 to 4 carbon atoms, such as methyl group, ethyl group, propyl group or butyl group.

Illustrative examples of the silyl monomers represented by the above formulas (1) to (3) include γ-methacryloyloxypropyl trimethoxysilane, γ-methacryloyloxypropyl triethoxysilane, γ-methacryloyloxypropyl methyldimethoxysilane, (3-acryloxypropyl)dimethylmethoxysilane, (3-acryloxypropyl)methyldimethoxysilane, (3-acryloxypropyl)trimethoxysilane, 3-(N-allylamino)propyltrimethoxysilane, allyldimethoxysilane, allyltriethoxysilane, allyltrimethoxysilane, 3-aminophenoxydimethylvinylsilane, 4-aminophenoxydimethylvinylsilane, 3-(3-aminopropoxy)-3,3-dimethyl-1-propenyl trimethoxysilane, butenyltriethoxysilane, 2-(chloromethyl)allyltrimethoxysilane, diethoxyvinylsilane, 1,3-divinyltetraethoxydisiloxane, docosenyltriethoxysilane, o-(methacryloxyethyl)-N-(triethoxysilylpropyl)urethane, N-(3-methacryloxy-2-hydroxypropyl)-3-aminopropyl triethoxysilane, methacryloxyethoxy trimethylsilane, (methacryloxymethyl)dimethylethoxysilane, methacryloxymethyl triethoxysilane, methacryloxymethyl trimethoxysilane, methacryloxypropyl dimethylethoxysilane, methacryloxypropyl dimethylmethoxysilane, methacryloxypropyl tris(methoxyethoxy)silane, 7-octenyltrimethoxysilane, 1,3-bis(methacryloxy)-2-trimethylsiloxypropane, tetrakis(2-methacryloxyethoxy)silane, trivinylethoxysilane, trivinylmethoxysilane, vinyldimethylethoxysilane, vinyldiphenylethoxysilane, vinylmethyldiacetoxysilane, vinylmethyldiethoxysilane, vinylmethyldimethoxysilane, o-(vinyloxyethyl)-N-(triethoxysilylpropyl)urethane, vinyloxytrimethylsilane, vinylphenyldiethoxysilane, vinylphenylmethylmethoxysilane, vinyltriacetoxysilane, vinyltri-t-butoxysilane, vinyltriethoxysilane, vinyltriisopropenoxysilane, vinyltriisopropoxysilane, vinyltrimethoxysilane, vinyltriphenoxysilane and vinyltris(2-methoxyethoxy)silane.

Out of these, γ-methacryloyloxypropyl trimethoxysilane, γ-methacryloyloxypropyl triethoxysilane, γ-methacryloyloxypropyl methyldimethoxysilane, (3-acryloxypropyl)dimethylmethoxysilane, (3-acryloxypropyl)methyldimethoxysilane, (3-acryloxypropyl)trimethoxysilane, (methacryloxymethyl)dimethylethoxysilane, methacryloxymethyl triethoxysilane, methacryloxymethyl trimethoxysilane, methacryloxypropyl dimethylethoxysilane, methacryloxypropyl dimethylmethoxysilane all of which are silyl monomers represented by the above formula (4) are particularly preferred.

In the present invention, adhesion between a substrate and a hard coat material can be improved by using an isocyanate monomer in place of the above silyl monomer.

Any known isocyanate monomer may be used if it has an isocyanate group (—NCO) and a radically polymerizable group.

This isocyanate monomer is represented by the following formula (5) or (6):

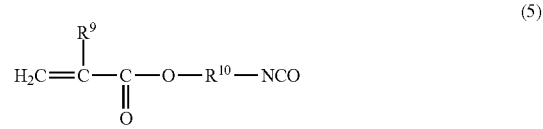

(5)

wherein $R^9$ is a hydrogen atom or methyl group, and $R^{10}$ is an alkylene group,

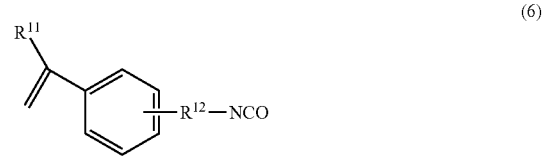

(6)

wherein $R^{11}$ is a hydrogen atom or methyl group, and $R^{12}$ is an alkylene group.

In the above formulas (5) and (6), $R^{10}$ and $R^{12}$ are both an alkylene group. The alkylene group is preferably an alkylene group having 1 to 10 carbon atoms. Examples of the alkylene group include methylene group, ethylene group, propylene group, trimethylene group and butylene group.

Preferred examples of the isocyanate monomer include 2-isocyanatoethoxy methacrylate and 4-(2-isocyanatoisopropyl)styrene.

The amount of the silyl monomer or isocyanate monomer in the present invention is not particularly limited but preferably 0.5 wt % or more, more preferably 1 wt % or more based on the total of all the radically polymerizable monomers to improve adhesion between a substrate such as a spectacle lens and a hard coat material. To improve scratch resistance and photochromic properties such as color development intensity and fading speed when the substrate is hard coated, it is preferably 20 wt % or less, more preferably 10 wt % or less. It is much more preferably 0.5 to 20 wt %, the most preferably 1 to 10 wt % based on the total of all the radically polymerizable monomers.

These silyl monomers or isocyanate monomers may be used alone or in combination of two or more, and a mixture of both monomers may also be used.

The curable composition of the present invention may comprise other radically polymerizable monomers (to be referred to as "other radically polymerizable monomers" hereinafter) in addition to the above silyl monomer and/or isocyanate monomer. This is preferred from the viewpoints of the characteristic properties such as solvent resistance, hardness and heat resistance of a cured product or photochromic properties such as color development intensity, fading speed and durability, after curing.

The other radically polymerizable monomers are not particularly limited and any known compounds having a radically polymerizable group such as (meth)acryloyl group, (meth)acryloyloxy group, vinyl group, allyl group or styryl group may be used. Out of these, compounds having a (meth)acryloyl group or (meth)acryloyloxy group as a radically polymerizable group are preferred from the viewpoints of acquisition ease and curability.

To improve the characteristic properties such as solvent resistance, hardness and heat resistance of a cured product or photochromic properties such as color development intensity and fading speed, after curing a combination of a radically polymerizable monomer having a homopolymer L-scale Rockwell hardness of 60 or more (may be referred to as "high-hardness monomer" hereinafter) and a radically polymerizable monomer having a homopolymer L-scale Rockwell hardness of 40 or less (may be referred to as "low-hardness monomer" hereinafter) is preferably used as other radically polymerizable monomers.

The term "L-scale Rockwell hardness" as used herein means hardness measured in accordance with JIS-B7726. By measuring a homopolymer of each monomer, it can be easily judged whether the monomer satisfies the above hardness requirement or not. Stated more specifically, as shown in examples to be described hereinafter, this can be easily confirmed by polymerizing a monomer to obtain a 2 mm-thick cured product, keeping it in a chamber maintained at 25° C. for 1 day and then measuring its L-scale Rockwell hardness with a Rockwell hardness meter.

The polymer used for the measurement of L-scale Rockwell hardness is obtained by cast polymerization under conditions that 90% or more of polymerzable groups contained in the charged monomer is polymerized. The L-scale Rockwell hardness of the cured product polymerized under the above conditions is measured as almost a constant value.

The above radically polymerizable monomer having a homopolymer L-scale Rockwell hardness of 60 or more (may be referred to as "high-hardness monomer" hereinafter) has the effect of improving the solvent resistance, hardness and heat resistance of a cured product after curing. To make this effect more marked, a radically polymerizable monomer having a homopolymer L-scale Rockwell hardness of 65 to 130 is preferred.

This high-hardness monomer is a compound which has generally 2 to 15, preferably 2 to 6 radically polymerizable groups. Preferred examples of the compound are represented by the following formulas (7) to (11):

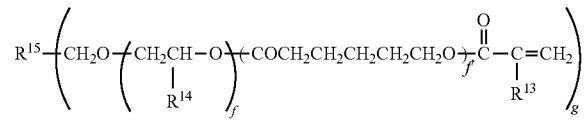
(7)

wherein $R^{13}$ is a hydrogen atom or methyl group, $R^{14}$ is a hydrogen atom, methyl group or ethyl group, $R^{15}$ is a tervalent to hexavalent organic residual group, f is an integer of 0 to 3, f' is an integer of 0 to 3, and g is an integer of 3 to 6,

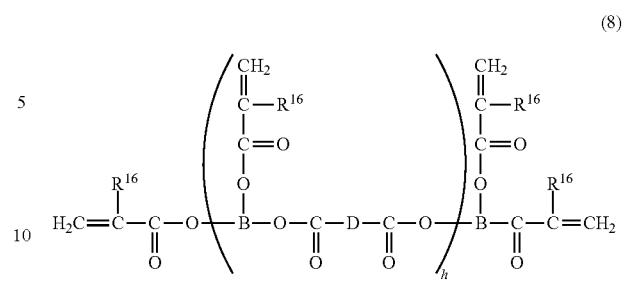
(8)

wherein $R^{16}$ is a hydrogen atom or methyl group, B is a tervalent organic residual group, D is a divalent organic residual group, and h is an integer of 1 to 10,

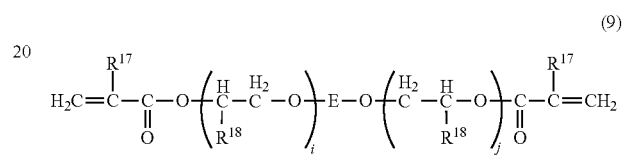
(9)

wherein $R^{17}$ is a hydrogen atom or methyl group, $R^{18}$ is a hydrogen atom, methyl group, ethyl group or hydroxyl group, E is a divalent organic residual group having a cyclic group, and i and j are each a positive integer or 0 that ensures that the average value of i+j is 0 to 6,

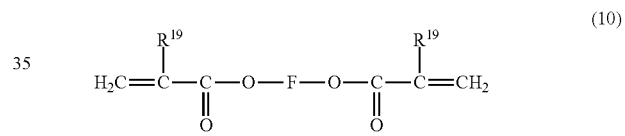
(10)

wherein $R^{19}$ is a hydrogen atom or methyl group, and F is an alkylene group which has 2 to 9 carbon atoms in the main chain and may have a side chain,

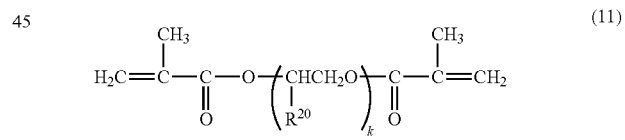
(11)

wherein $R^{20}$ is a hydrogen atom, methyl group or ethyl group, and k is an integer of 1 to 6.

$R^{13}$, $R^{16}$, $R^{17}$ and $R^{19}$ in the above formulas (7) to (10) are each a hydrogen atom or methyl group. Therefore, compounds represented by the formulas (7) to (10) are compounds having 2 to 6 (meth)acryloyloxy groups.

$R^{14}$ in the above formula (7) is a hydrogen atom, methyl group or ethyl group.

$R^{15}$ in the above formula (7) is a tervalent to hexavalent organic residual group. The organic residual group is not particularly limited and may contain a bond other than a carbon-carbon bond, such as an ester bond, ether bond, amide bond, thioether bond, sulfonyl bond or urethane bond in the main chain. To achieve a homopolymer L-scale Rockwell hardness of 60 or more, $R^{15}$ is preferably an organic residual group having 1 to 30 carbon atoms, more preferably an organic residual group which has 1 to 15 carbon atoms and may contain an ether bond and/or an urethane bond.

f and f' are each independently an integer of 0 to 3. When f and f' are larger than 3, the L-scale Rockwell hardness of the homopolymer of the monomer tends to be smaller than 60. To obtain an L-scale Rockwell hardness to 60 or more, the total of f and f' is preferably 0 to 3.

Illustrative examples of the high-hardness monomer represented by the formula (7) include trimethylolpropane trimethacrylate, trimethylolpropane triacrylate, tetramethylolmethane trimethacrylate, tetramethylolmethane triacrylate, trimethylolpropane trimethacrylate, tetramethylolmethane tetramethacrylate, tetramethylolmethane tetraacrylate, trimethylolpropane triethylene glycol trimethacrylate, trimethylolpropane triethylene glycol triacrylate, ethoxylated pentaerythritol tetraacrylate, ethoxylated pentaerythritol tetramethacrylate, pentaerythritol trimethacrylate, pentaerythritol tetramethacrylate, dipentaerythritol hexaacrylate, urethane oligomer tetraacrylate, urethane oligomer hexamethacrylate, urethane oligomer hexaacrylate, polyester oligomer hexaacrylate, caprolactone-modified dipentaerythritol hexaacrylate and ditrimethylolpropane tetraacrylate.

B in the above formula (8) is a tervalent organic residual group and D is a divalent organic residual group. B and D are not particularly limited and may contain a bond other than a carbon-carbon bond, such as an ester bond, ether bond, amide bond, thioether bond, sulfonyl bond or urethane bond in the main chain. To achieve a homopolymer L-scale Rockwell hardness of 60 or more, B is preferably an organic residual group derived from a linear or branched hydrocarbon having 3 to 10 carbon atoms and D is preferably an organic residual group derived from a linear or branched aliphatic hydrocarbon having 1 to 10 carbon atoms or an aromatic hydrocarbon having 6 to 10 carbon atoms.

To achieve a homopolymer L-scale Rockwell hardness of 60 or more, h is an integer of 1 to 10, preferably 1 to 6.

Illustrative examples of the high-hardness monomer represented by the formula (8) include tetrafunctional polyester oligomers having a molecular weight of 2,500 to 3,500 (EB80 of Daicel UCB Co., Ltd., etc.), tetrafunctional polyester oligomers having a molecular weight of 6,000 to 8,000 (EB450 of Daicel UCB Co., Ltd., etc.), hexafunctional polyester oligomers having a molecular weight of 45,000 to 55,000 (EB1830 of Daicel UCB Co., Ltd., etc.) and tetrafunctional polyester oligomers having a molecular weight of 10,000 (GX8488B of Dai-Ichi Kogyo Seiyaku Co., Ltd., etc.).

$R^{18}$ in the above formula (9) is a hydrogen atom, methyl group, ethyl group or hydroxyl group.

E in the above formula (9) is a divalent organic residual group containing a cyclic group. The organic residual group is not particularly limited if it contains a cyclic group and may contain a bond other than a carbon-carbon bond, such as an ester bond, ether bond, amide bond, thioether bond, sulfonyl group or urethane bond in the main chain. Examples of the cyclic group contained in E include benzene ring, cyclohexane ring, adamantane ring and the following cyclic groups.

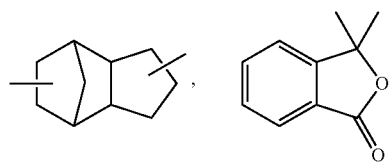

The cyclic group contained in E is preferably a benzene ring and E is preferably a group represented by the following formula:

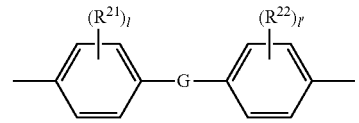

wherein G is selected from an oxygen atom, sulfur atom, $-SO_2)-$, $-C(O)-$, $-CH_2-$, $-CH=CH-$, $-C(CH_3)_2-$ and $-C(CH_3)(C_6H_5)-$, $R^{21}$ and $R^{22}$ are each independently an alkyl group having 1 to 4 carbon atoms or halogen atom, and l and l' are each independently an integer of 0 to 4.

E is the most preferably a group represented by the following formula.

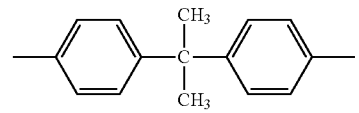

In the formula (9), i and j are each a positive integer or 0 that ensures that the average value of i+j is 0 to 6. The compound represented by the formula (9) is obtained as a mixture of a plurality of compounds in which i and j are different from each other, except the case where i and j are both 0. Since it is difficult to isolate the compounds, i and j are expressed by the average value of i+j. The average value of i+j is more preferably 2 to 6.

Illustrative examples of the compound represented by the formula (9) include bisphenol A dimethacrylate, 2,2-bis(4-methacryloyloxyethoxyphenyl)propane and 2,2-bis(3,5-dibromo-4-methacryloyloxyethoxyphenyl) propane.

$R^{19}$ in the above formula (10) is a hydrogen atom or methyl group. F is an alkylene group which has 2 to 9 carbon atoms in the main chain and may have a side chain. Examples of the alkylene group having 2 to 9 carbon atoms in the main chain include ethylene group, propylene group, trimethylene group, butylenes group, neopentylene group, hexylene group and nonylylene group. When the length of the chain is more than 9 carbon atoms, the homopolymer L-scale Rockwell hardness tends not to be 60 or more.

Examples of the compound represented by the formula (10) include ethylene glycol diacrylate, ethylene glycol dimethacrylate, 1,4-butylene glycol dimethacrylate, 1,9-nonylene glycol dimethacrylate, neopentylene glycol dimethacrylate and neopentylene glycol diacrylate.

$R^{20}$ in the above formula (11) is a hydrogen atom, methyl group or ethyl group, and k is an integer of 2 to 6. When k is more than 6, the homopolymer L-scale Rockwell hardness tends not to be 60 or more. k is preferably 3 or 4.

Illustrative examples of the compound represented by the formula (11) include diethylene glycol dimethacrylate, triethylene glycol dimethacrylate, tetraethylene glycol dimethacrylate, tripropylene glycol dimethacrylate and tetrapropylene glycol dimethacrylate.

These radically polymerizable monomers having a homopolymer L-scale Rockwell hardness of 60 or more may be used alone or in combination of two or more.

The compounds represented by the above formulas (7) to (11) include compounds having a homopolymer L-scale Rockwell hardness of less than 60 according to a combination of substituents. In this case, the compounds are classified into a group of low-hardness monomers to be described hereinafter or a group of intermediate-hardness monomers.

There are high-hardness monomers which are not represented by the above formulas (7) to (11). Typical examples of the compounds include bisphenol A diglycidyl methacrylate, ethylene glycol bisglycidyl methacrylate and glycidyl methacrylate.

The curable composition of the present invention preferably comprises a low-hardness monomer having a homopolymer L-scale Rockwell hardness of 40 or less in addition to the above high-hardness monomer.

The low-hardness monomer has the effect of making a cured product strong and improving the fading speed of a photochromic compound.

Illustrative examples of the low-hardness monomer include bifunctional monomers represented by the following formula (12):

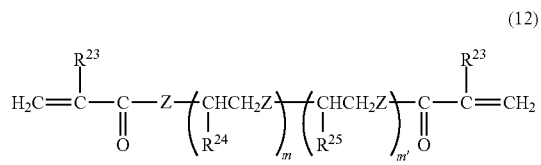

(12)

wherein $R^{23}$ is a hydrogen atom or methyl group, $R^{24}$ and $R^{25}$ are each independently a hydrogen atom, methyl group or ethyl group, Z is an oxygen atom or sulfur atom, m is an integer of 1 to 70 when $R^{23}$ is a hydrogen atom and an integer of 7 to 70 when $R^{23}$ is a methyl group, and m' is an integer of 0 to 70,
and the following formula (13):

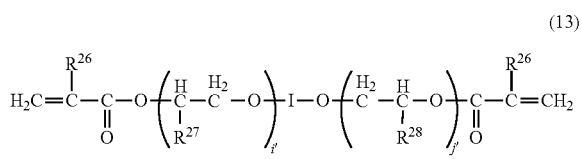

(13)

wherein $R^{26}$ is a hydrogen atom or methyl group, $R^{27}$ and $R^{28}$ are each independently a hydrogen atom, methyl group, ethyl group or hydroxyl group, I is a divalent organic residual group containing a cyclic group, and i' and j' are each an integer that ensures that the average value of i'+j' is 8 to 40,
and monofunctional monomers represented by the following formula (14):

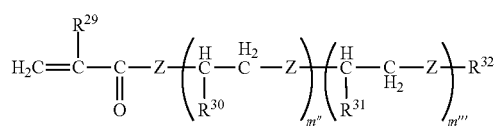

(14)

wherein $R^{29}$ is a hydrogen atom or methyl group, $R^{30}$ and $R^{31}$ are each independently a hydrogen atom, methyl group or ethyl group, $R^{32}$ is a hydrogen atom, alkyl group, alkenyl group, alkoxyalkyl group, haloalkyl group having 1 to 25 carbon, aryl group having 6 to 25 carbon atoms or acyl group having 2 to 25 carbon atoms other than (meth)acryloyl group, Z is an oxygen atom or sulfur atom, m" is an integer of 1 to 70 when $R^{29}$ is a hydrogen atom, m" is an integer of 4 to 70 when $R^{29}$ is a methyl group, and m'" is an integer of 0 to 70,
and the following formula (15):

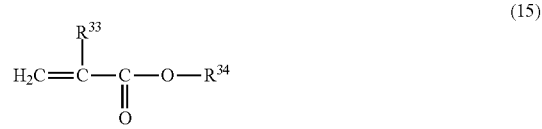

(15)

wherein $R^{33}$ is a hydrogen atom or methyl group, $R^{34}$ is an alkyl group having 1 to 20 carbon atoms when $R^{33}$ is a hydrogen atom and an alkyl group having 8 to 40 carbon atoms when $R^{33}$ is a methyl group.

In the above formulas (12) to (15), $R^{23}$, $R^{26}$, $R^{29}$ and $R^{33}$ are each a hydrogen atom or methyl group. That is, the low-hardness monomer generally has 2 or less (meth)acryloyloxy groups or (meth)acryloylthio groups as polymerizable groups.

$R^{24}$ and $R^{25}$ in the above formula (12) are each independently a hydrogen atom, methyl group or ethyl group, and Z is an oxygen atom or sulfur atom.

In the above formula (12), when $R^{23}$ is a hydrogen atom, that is, the monomer has an acryloyloxy group or acryloylthio group as a polymerizable group, m is an integer of 7 to 70 and when $R^{23}$ is a methyl group, that is, the monomer has a methacryloyloxy group or methacryloylthio group as a polymerizable group, m is an integer of 1 to 70. m' is an integer of 0 to 70.

Illustrative examples of the low-hardness monomer represented by the above formula (12) include alkylene glycol di(meth)acrylates such as trialkylene glycol diacrylate, tetraalkylene glycol diacrylate, nonylalkylene glycol diacrylate and nonylalkylene glycol dimethacrylate.

$R^{26}$ in the above formula (13) is a hydrogen atom, methyl group or ethyl group. I is a divalent organic residual group containing a cyclic group. Examples of I are the same as those listed for E contained in the above formula (9). i' and j' in the above formula (13) are each an integer that ensures that the average value of i'+j' is 8 to 40, preferably 9 to 30. i' and j' are also expressed by the average value for the same reason as i and j in the above formula (9).

Illustrative examples of the low-hardness monomer represented by the formula (13) include 2,2-bis(4-acryloyloxy polyethylene glycol phenyl)propane having an average molecular weight of 776.

$R^{29}$ in the above formula (14) is hydrogen atom or methyl group, $R^{30}$ and $R^{31}$ are each independently a hydrogen atom, methyl group or ethyl group. $R^{32}$ is a hydrogen atom, alkyl group, alkenyl group, alkoxyalkyl group, haloalkyl group having 1 to 25 carbon atoms, aryl group having 6 to 25 carbon atoms or acyl group having 2 to 25 carbon atoms other than an acryloyl group.

Examples of the alkyl group and alkenyl group having 1 to 25 carbon atoms include methyl group, ethyl group, propyl group or nonyl group. These alkyl groups and alkenyl groups may be linear or branched and may have a substituent such as halogen atom, hydroxyl group, aryl group or epoxy group.

Examples of the alkoxyalkyl group having 1 to 25 carbon atoms include methoxybutyl group, ethoxybutyl group, butoxybutyl group and methoxynonyl group.

Examples of the aryl group having 6 to 25 carbon atoms include phenyl group, toluyl group, anthranyl group and octylphenyl group. Examples of the acyl group other than a (meth)acryloyl group include acetyl group, propionyl group, butyryl group, valeryl group and oleyl group.

m" in the formula (14) is an integer of 1 to 70 when $R^{29}$ is a hydrogen atom, that is, the monomer has an acryloyloxy group or acryloylthio group as a polymerizable group and an integer of 4 to 70 when $R^{29}$ is a methyl group, that is, the monomer has a methacryloyloxy group or methacryloylthio group as a polymerizable group, and m'" is an integer of 0 to 70.

Illustrative examples of the low-hardness monomer represented by the formula (14) include polyalkylene glycol (meth)arylates such as polyethylene glycol methacrylate having an average molecular weight of 526, polyethylene glycol methacrylate having an average molecular weight of 360, methyl ether polyethylene glycol methacrylate having an average molecular weight of 475, methyl ether polyethylene glycol methacrylate having an average molecular weight of 1,000, polypropylene glycol methacrylate having an average molecular weight of 375, polypropylene methacrylate having an average molecular weight of 430, polypropylene methacrylate having an average molecular weight of 622, methyl ether polypropylene glycol methacrylate having an average molecular weight of 620, polytetramethylene glycol methacrylate having an average molecular weight of 566, octylphenyl ether polyethylene glycol methacrylate having an average molecular weight of 2,034, nonylether polyethylene glycol methacrylate having an average molecular weight of 610, methyl ether polyethylene thioglycol methacrylate having an average molecular weight of 640 and perfluoroheptyl ethylene glycol methacrylate having an average molecular weight of 498.

$R^{33}$ in the above formula (15) is a hydrogen atom or methyl group. When $R^{33}$ is a hydrogen atom, $R^{34}$ is an alkyl group having 1 to 20 carbon atoms and when $R^{33}$ is a methyl group, $R^{34}$ is an alkyl group having 8 to 40 carbon atoms.

These alkyl groups may be linear or branched and may have a substituent such as halogen atom, hydroxyl group, alkoxyl group, acyl group or epoxy group.

Illustrative examples of the low-hardness monomer represented by the formula (15) include stearyl methacrylate, lauryl methacrylate, ethyl hexyl methacrylate, methyl acrylate, ethyl acrylate, butyl acrylate and lauryl acrylate.

Out of these low-hardness monomers represented by the formulas (12) to (15), methyl ether polyethylene glycol methacrylate having an average molecular weight of 475, methyl ether polyethylene glycol methacrylate having an average molecular weight of 1,000, trialkylene glycol diacrylate, tetraalkylene glycol diacrylate, nonylalkylene glycol diacrylate, methyl acrylate, ethyl acrylate, butyl acrylate and lauryl acrylate are particularly preferred.

These radically polymerizable monomers having a homopolymer L-scale Rockwell hardness of 40 or less may be used alone or in combination of two or more.

The compounds represented by the above formulas (12) to (15) include compounds having a homopolymer L-scale Rockwell hardness of 40 or more according to a combination of substituents. In this case, the compounds are classified into a group of high-hardness monomers described above or a group of intermediate-hardness monomers to be described hereinafter.

Monomers which are neither high-hardness monomers nor low-hardness monomers, that is, monomers having a homopolymer L-scale Rockwell hardness of more than 40 and less than 60 (may be referred to as "intermediate-hardness monomer" hereinafter) include bifunctional (meth)acrylates such as a polytetramethylene glycol dimethacrylate having an average molecular weight of 650, polytetramethylene glycol dimethacrylate having an average molecular weight of 1,400 and bis(2-methacryloyloxyethylthioethyl)sulfide; polyallyl compounds such as diallyl phthalate, diallyl isophthalate, diallyl tartarate, diallyl epoxysuccinate, diallyl fumarate, diallyl chlorendate, diallyl hexaphthalate and allyl diglycol carbonate; polyvalent thioacrylate and polyvalent thiomethacrylate compounds such as 1,2-bis(methacryloylthio)ethane, bis(2-acryloylthioethyl)ether and 1,4-bis(methacryloylthiomethyl)benzene; unsaturated carboxylic acids such as acrylic acid, methacrylic acid and maleic anhydride; acrylate and methacrylate compounds such as methyl methacrylate, butyl methacrylate, benzyl methacrylate, phenyl methacrylate, 2-hydroxyethyl methacrylate and biphenyl methacrylate; fumarate compounds such as diethyl fumarate and diphenyl fumarate; thioacrylate and thiomethacrylate compounds such as methyl thioacrylate, benzyl thioacrylate and benzyl thiomethacrylate; vinyl compounds such as styrene, chlorostyrene, methylstyrene, vinylnaphthalene, α-methylstyrene dimer, bromostyrene, divinylbenzene and vinylpyrrolidone; and (meth)acrylates whose hydrocarbon chain having an unsaturated bond in the molecule has 6 to 25 carbon atoms, such as oleyl methacrylate, nerol methacrylate, geraniol methacrylate, linalool methacrylate and farnesol methacrylate. These intermediate-hardness monomers may also be used.

The above high-hardness monomers, low-hardness monomers and intermediate-hardness monomers may be suitably mixed together before use. To improve the balance of the characteristic properties such as solvent resistance, hardness and heat resistance or photochromic properties such as color development intensity and fading speed of a cured product of the curable composition, the amount of a low-hardness monomer is preferably 5 to 70 wt % and the amount of a high-hardness monomer is preferably 5 to 95 wt % based on the total of all the other radically polymerizable monomers excluding the above silyl monomer and isocyanate monomer. Further, it is particularly preferred that a monomer having three or more radically polymerizable groups should be contained as the high-hardness monomer in an amount of at least 5 wt % based on the total of all the other radically polymerizable monomers.

Preferably, the radically polymerizable monomers in the present invention include a radically polymerizable monomer having at least one epoxy group and at least one radically polymerizable group in the molecule (may be simply referred to as "epoxy-based monomer" hereinafter) besides the above monomers classified by hardness. The epoxy monomer may have an L-scale Rockwell hardness of its cured product of 60 or more, or 40 or less according to its structure. The monomer is classified into any one of groups of high-hardness monomers, low-hardness monomers and intermediate-hardness monomers according to homopolymer hardness.

The durability of a photochromic compound and the adhesion of a photochromic coating layer can be improved by using this epoxy-based monomer as one of the radically polymerizable monomers in the present invention.

Although known compounds may be used as the epoxy-based monomer, a compound having a (meth)acryloyloxy group as a radically polymerizable group is preferred.

This epoxy-based monomer is generally represented by the following formula (16):

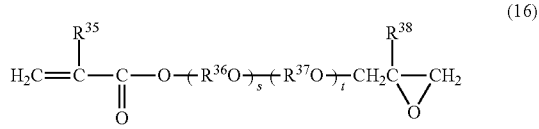

(16)

wherein $R^{35}$ and $R^{38}$ are each independently a hydrogen atom or methyl group, and $R^{36}$ and $R^{37}$ are each independently an alkylene group having 1 to 4 carbon atoms or a group represented by the following formula:

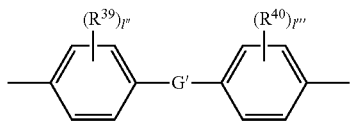

wherein G' is selected from an oxygen atom, sulfur atom, —S(O$_2$)—, —C(O)—, —CH$_2$—, —CH=CH—, —C(CH$_3$)$_2$— and —C(CH$_3$)(C$_6$H$_5$)—, $R^{39}$ and $R^{40}$ are each independently an alkyl group having 1 to 4 carbon atoms or halogen atom, and 1″ and 1‴ are each independently an integer of 0 to 4.

Examples of the alkylene group having 1 to 4 carbon atoms represented by $R^{36}$ and $R^{37}$ include methylene group, ethylene group, propylene group, trimethylene group and butylene groups. These alkylene groups may have a substituent such as hydroxyl group or halogen atom.

When $R^{36}$ and/or $R^{37}$ are/is a group represented by the following formula,

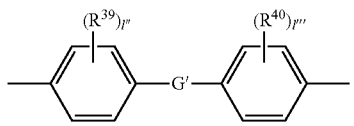

G' is selected from an oxygen atom, sulfur atom, —S(O$_2$)—, —C(O)—, —CH$_2$—, —CH=CH—, —C(CH$_3$)$_2$ and —C(CH$_3$)(C$_6$H$_5$)—, $R^{39}$ and $R^{40}$ are each independently an alkyl group having 1 to 4 carbon atoms such as methyl group, ethyl group, propyl group or butyl group, or halogen atom such as chlorine atom or bromine atom, and 1″ and 1‴ are each independently an integer of 0 to 4. The group represented by the above formula is the most preferably a group represented by the following formula.

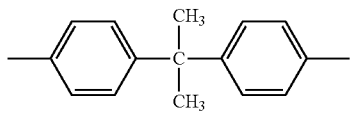

Illustrative examples of the epoxy-based monomer represented by the above formula (16) include glycidyl acrylate, glycidyl methacrylate, β-methylglycidyl methacrylate, bisphenol A-monoglycidyl ether-methacrylate, 4-glycidyloxy methacrylate, 3-(glycdiyl-2-oxyethoxy)-2-hydroxypropyl methacrylate, 3-(glycidyloxy-1-isopropyloxy)-2-hydroxypropyl acrylate, 3-glycidyloxy-2-hydroxypropyloxy)-2-hydroxypropyl acrylate and glycidyloxy polyethylene glycol methacrylate having an average molecular weight of 540. Out of these, glycidyl acrylate, glycidyl methacrylate and glycidyloxy polyethylene glycol methacrylate having an average molecular weight of 540 are particularly preferred.

The amount of the epoxy-based monomer is 0.01 to 30 wt %, particularly preferably 0.1 to 20 wt % based on the total of all "the other radically polymerizable monomers," which are radically polymerizable monomers other than silyl monomer and isocyanate monomer as defined above.

The curable composition of the present invention comprises an amine compound in addition to the above radically polymerizable monomers. Adhesion between a coating layer which is a cured product of the curable composition and a substrate can be greatly improved by using an amine compound when the curable composition of the present invention is used as a coating material.

Any known amine compound may be used in the present invention if it is a basic compound which serves as an condensation catalyst or addition catalyst for the above silyl monomer or isocyanate monomer.

An amine compound which does not have the function of the amine compound in the present invention is a hindered amine compound having only an amino group represented by the following formula:

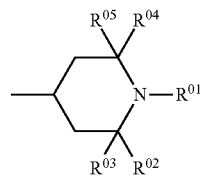

wherein $R^{01}$ is a hydrogen atom or alkyl group, and $R^{02}$, $R^{03}$, $R^{04}$ and $R^{05}$ are the same or different alkyl groups.

Illustrative examples of the amine compound advantageously used in the present invention include nonpolymerizable low-molecular weight amine compounds such as triethanolamine, N-methyldiethanolamine, triisopropanolamine, 4,4-dimethylaminobenzophenone and diazabicyclooctane, amine compounds having a polymerizable group such as N,N-dimethylaminoethyl methacrylate and N,N-diethylaminoethyl methacrylate, and amine compounds having a silyl group such as n-(hydroxyethyl)-N-methylaminopropyl trimethoxysilane, dimethoxyphenyl-2-piperidinoethoxysilane, N,N-diethylaminomethyl trimethylsilane and (N,N-diethyl-3-aminopropyl)trimethoxysilane.

Out of the above preferred amino compounds, an amine compound having a hydroxyl group, or (meth)acryloyloxy group as a radically polymerizable group, a group capable of forming a silanol group by hydrolysis is preferred from the viewpoint of improving adhesion. For example, an amine compound represented by the following formula (17) is more preferred as an amine compound having strong basicity and excellent effect improving adhesion:

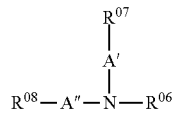

(17)

wherein $R^{06}$ is a hydrogen atom or a linear alkyl group having 1 to 4 carbon atoms, $R^{07}$ is a hydroxyl group, a (meth)acryloyloxy group or a group capable of forming a silanol group by hydrolysis and R⁰⁸ is a hydrogen atom, an alkyl group having 1 to 6 carbon atoms, a hydroxyl group, a (meth)acryloyloxy group or a group capable of forming a silanol group by hydrolysis, and A' is an alkylene group having 2 to 6 carbon atoms, A" is an alkylene group having 1 to 6 carbon atoms when R⁰⁸ is a hydrogen atom or an alkyl group, A" is an alkylene group having 2 to 6 carbon atoms when R⁰⁸ is a hydroxyl group, a (meth)acryloyloxy group or a group capable of forming a silanol group by hydrolysis.

The groups capable of forming a silanol group by hydrolysis represented by R⁰⁷ and R⁰⁸ in the above formula (17) are defined the same as the group defined for the above silyl monomer.

These amine compounds may be used alone or in combination of two or more. The amount of the amine compound is 0.01 to 20 parts by weight based on 100 parts by weight of the total of all the radically polymerizable monomers. It is preferably 0.1 to 10 parts by weight, more preferably 1 to 10 parts by weight. When the amount is smaller than 0.01 part by weight or larger than 20 parts by weight, the effect of improving adhesion between a coating layer and a substrate is not obtained. Further, when the amount is larger than 20 parts by weight, the amine compound may cause the yellowing of the coating layer disadvantageously.

A known photochromic compound may be used as the photochromic compound used in the curable composition of the present invention. Photochromic compounds such as fulgimide compounds, spirooxazine compounds and chromene compounds are well known and may be used in the present invention without restriction.

The above fulgimide compounds, spirooxazine compounds and chromene compounds disclosed in JP-A 2-28154 (the term "JP-A" as used herein means an "unexamined published Japanese patent application"), JP-A 62-288830, WO94/22850, WO96/14596, etc. can be advantageously used.

Also, compounds newly discovered by the inventors of the present invention or the other persons as compounds having excellent photochromic properties as disclosed in JP-A 2001-114775, JP-A 2001-031670, JP-A 2001-011067, JP-A 2001-011066, JP-A 2000-347346, JP-A 2000-344762, JP-A 2000-344761, JP-A 2000-327676, JP-A 2000-327675, JP-A 2000-256347, JP-A 2000-229976, JP-A 2000-229975, JP-A 2000-229974, JP-A 2000-229973, JP-A 2000-229972, JP-A 2000-219687, JP-A 2000-219686, JP-A 2000-219685, JP-A 11-322739, JP-A 11-286484, JP-A 11-279171, JP-A 10-298176, JP-A 09-218301, JP-A 09-124645, JP-A 08-295690, JP-A 08-176139 and JP-A 08-157467 may also be advantageously used.

Out of these photochromic compounds, chromene-based photochromic compounds can be particularly preferably used because they have higher photochromic properties durability than other photochromic compounds and the improvement of their photochromic properties such as color development intensity and fading speed by the present invention is larger than other photochromic compounds. Further, out of these chromene-based photochromic compounds, compounds having a molecular weight of 540 or more can be preferably used because the effect of improving photochromic properties such as color development intensity and fading speed by the present invention is particularly larger than other chromene-based photochromic compounds.

Moreover, chromene compounds which are particularly excellent in terms of photochromic properties such as color development intensity, fading speed and durability are generally represented by the following formula (18):

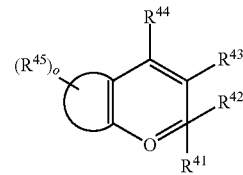

wherein the group represented by the following formula (19):

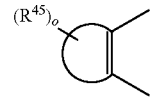

is a substituted or nonsubstituted aromatic hydrocarbon group, or substituted or nonsubstituted unsaturated heterocyclic group, $R^{43}$, $R^{44}$ and $R^{45}$ are each independently a hydrogen atom, alkyl group, alkoxyl group, aralkoxy group, amino group, substituted amino group, cyano group, substituted or nonsubstituted aryl group, halogen atom, aralkyl group, hydroxyl group, substituted or nonsubstituted alkynyl group, substituted or nonsubstituted heterocyclic group having a nitrogen atom as a hetero atom bonded to a pyran ring or the ring of the group represented by the above formula (19), or condensation heterocyclic group having an aromatic hydrocarbon ring or aromatic hetero ring condensed to the heterocyclic group, o is an integer of 0 to 6, and $R^{41}$ and $R^{42}$ are each independently a group represented by the following formula (20):

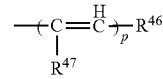

wherein $R^{46}$ is a substituted or nonsubstituted aryl group, or substituted or nonsubstituted heteroaryl group, $R^{47}$ is a hydrogen atom, alkyl group or halogen atom, and p is an integer of 1 to 3, group represented by the following formula (21):

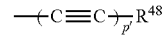

wherein $R^{48}$ is a substituted or nonsubstituted aryl group, or substituted or nonsubstituted heteroaryl group, and p' is an integer of 1 to 3, substituted or nonsubstituted aryl group, substituted or nonsubstituted heteroaryl group or alkyl group, or $R^{41}$ and $R^{42}$ may form an aliphatic hydrocarbon ring or aromatic hydrocarbon ring together.

Examples of the substituent of the substituted aryl group or substituted heteroaryl group in the above formulas (20) and (21) or defined for $R^{41}$ and $R^{42}$ are the same as those listed for $R^{43}$ and $R^{44}$.

Out of the chromene compounds represented by the above formula (18), compounds represented by the following formulas (22) to (27) are particularly preferred from the viewpoints of photochromic properties such as color development intensity and fading speed, and durability:

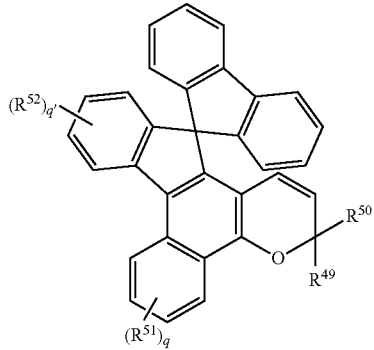
(22)

wherein $R^{49}$ and $R^{50}$ are defined the same as $R^{41}$ and $R^{42}$ in the above formula (18), $R^{51}$ and $R^{52}$ are defined the same as $R^{45}$ in the above formula (18), and q and q' are each an integer of 1 or 2,

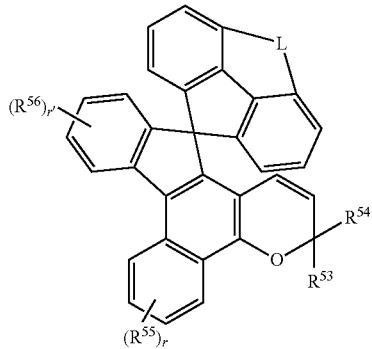
(23)

wherein $R^{53}$ and $R^{54}$ are defined the same as $R^{41}$ and $R^{42}$ in the above formula (18), $R^{55}$ and $R^{56}$ are defined the same as $R^{45}$ in the above formula (18), L is represented by the following formula:

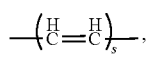,

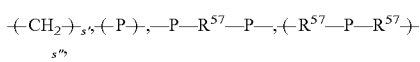

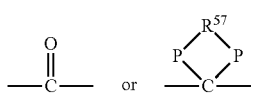

(P is an oxygen atom or sulfur atom, $R^{57}$ is an alkylene group having 1 to 6 carbon atoms, and s, s' and s" are each an integer of 1 to 4),
and r and r' are each independently an integer of 1 or 2,

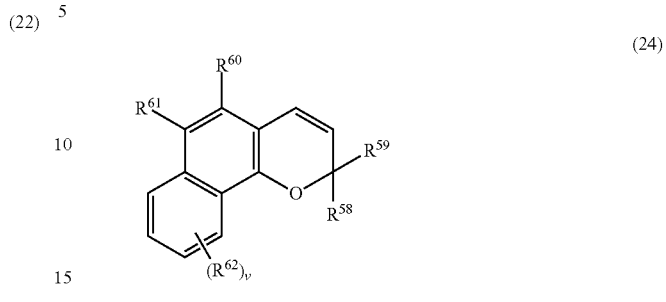
(24)

wherein $R^{58}$ and $R^{59}$ are defined the same as $R^{41}$ and $R^{42}$ in the above formula (18), $R^{60}$, $R^{61}$ and $R^{62}$ are defined the same as $R^{45}$ in the above formula (18), and v is an integer of 1 or 2,

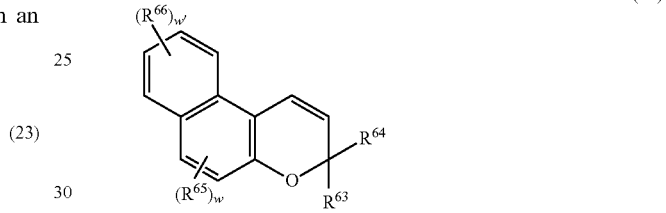
(25)

wherein $R^{63}$ and $R^{64}$ are defined the same as $R^{41}$ and $R^{42}$ in the above formula (18), $R^{65}$ and $R^{66}$ are defined the same as $R^{45}$ in the above formula (18), and w and w' are each independently an integer of 1 or 2,

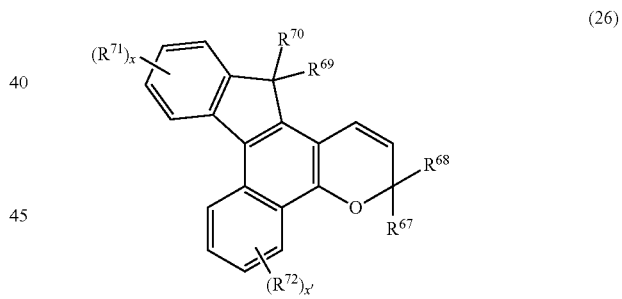
(26)

wherein $R^{67}$ and $R^{68}$ are defined the same as $R^{41}$ and $R^{42}$ in the above formula (18), $R^{69}$, $R^{70}$, $R^{71}$ and $R^{72}$ are defined the same as $R^{45}$ in the above formula (1.8), and x and x' are each independently an integer of 1 or 2,

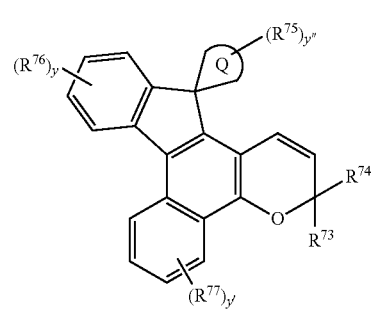
(27)

wherein $R^{73}$ and $R^{74}$ are defined the same as $R^{41}$ and $R^{42}$ in the above formula (18), $R^{75}$, $R^{76}$ and $R^{77}$ are defined the same as $R^{45}$ in the above formula (18),

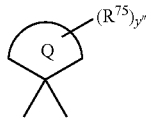

is an aliphatic hydrocarbon ring which may have at least one substituent, and y, y' and y" are each independently an integer of 1 or 2.

Out of the chromene compounds represented by the above formulas (22), (23), (24), (25), (26) and (27), chromene compounds having the following structures are particularly preferred.

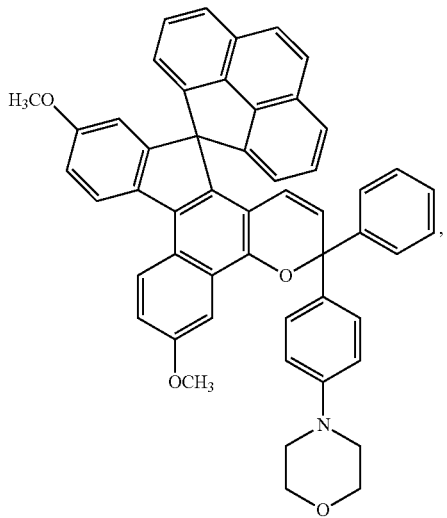

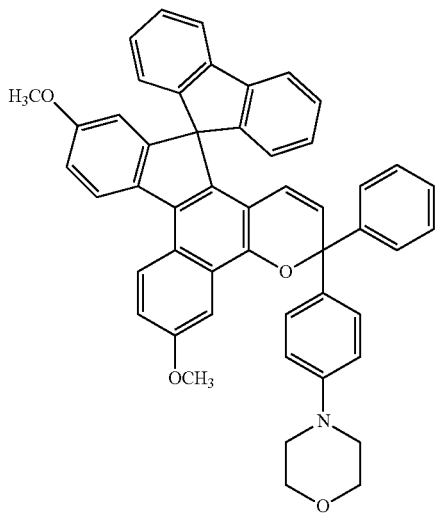

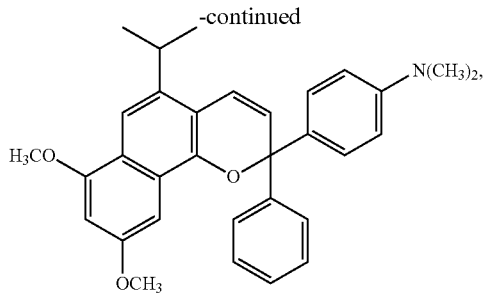

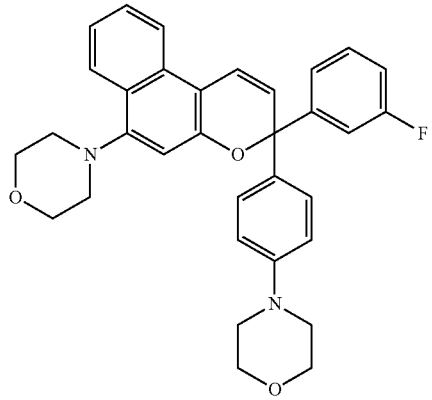

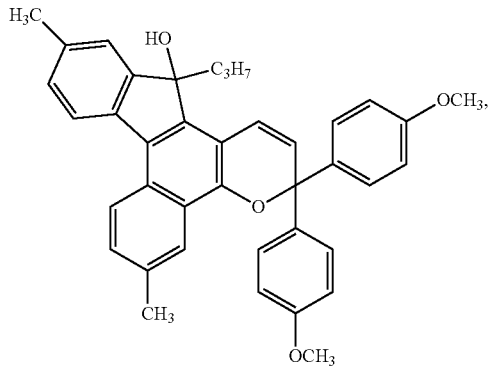

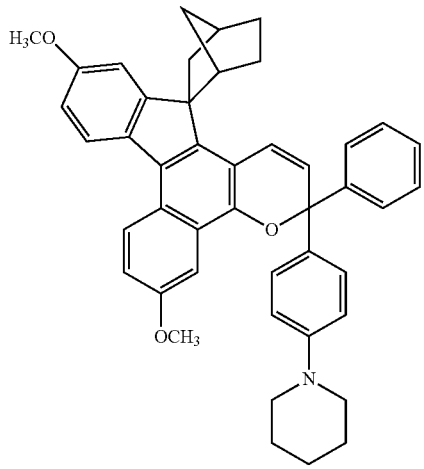

These photochromic compounds may be suitably used in combination of two or more to develop a suitable color.

In the curable composition of the present invention, the amount of the photochromic compound is 0.01 to 20 parts by weight, preferably 0.05 to 15 parts by weight, more preferably 0.1 to 10 parts by weight based on 100 parts by weight of the total of all the radically polymerizable monomers. When the amount of the photochromic compound is smaller than 0.01 part by weight, the color development intensity may lower and when the amount is larger than 20 parts by weight, the photochromic compound does not dissolve in the polymerizable monomers completely, whereby the resulting solution may become heterogeneous and the color development intensity may become nonuniform.

When the curable composition of the present invention is used to coat an optical material to be described hereinafter, suitable color development intensity can be obtained by increasing the concentration of the photochromic compound if the thickness of the coating layer is small or by reducing the concentration if the thickness is large. Stated more specifically, it is particularly preferred that when the thickness of the coating layer is about 10 µm, the photochromic compound should be used in an amount of 5 to 15 parts by weight based on 100 parts by weight of the total of all the radically polymerizable monomers and when the thickness of the coating layer is about 50 µm, the photochromic compound should be used in an amount of 0.1 to 1 part by weight.

The curable composition of the present invention may further contain additives such as a surfactant, antioxidant, radical scavenger, ultraviolet light stabilizer, ultraviolet light absorber, release agent, discoloration preventing agent, antistatic agent, fluorescent dye, dye, pigment, perfume and plasticizer to improve the durability, color developing speed, fading speed and moldability of a photochromic compound. It is extremely preferred to blend a polymerization initiator to be described hereinafter in order to cure the curable composition. Any known compounds may be used as the above additives.

For example, the surfactant may be nonionic, anionic or cationic. A nonionic surfactant is preferred from the viewpoint of solubility in polymerizable monomers. Preferred examples of the nonionic surfactant include sorbitan fatty acid esters, glycerin fatty acid esters, decaglycerin fatty acid esters, propylene glycol.pentaerythritol fatty acid esters, polyoxyethylene sorbitan fatty acid esters, polyoxyethylene sorbite fatty acid esters, polyoxyethylene glycerin fatty acid esters, polyethylene glycol fatty acid esters, polyoxyethylene alkyl ethers, polyoxyethylene phytosterol.phytostanol, polyoxyethylene polyoxypropylene alkyl ethers, polyoxyethylene alkylphenyl ethers, polyoxyethylene castor oil.hardened castor oil, polyoxyethylene lanolin.lanolin alcohol.beeswax derivatives, polyoxyethylene alkylamine.fatty acid amides, polyoxyethylene alkylphenyl formaldehyde condensates and single-chain polyoxyethylene alkyl ethers. These surfactants may be used in combination of two or more. The amount of the surfactant is preferably 0.1 to 20 parts by weight based on 100 parts by weight of the total of all the polymerizable monomers.

As the antioxidant, radical scavenger, ultraviolet light stabilizer and ultraviolet light absorber may be preferably used hindered amine light stabilizers, hindered phenol antioxidants, phenol-based radical scavengers, sulfur-based antioxidants, benzotriazole-based compounds and benzophenone-based compounds. These antioxidants, radical scavengers, ultraviolet light stabilizers or ultraviolet light absorbers may be used in combination of two or more. To use these non-polymerizable compounds, a surfactant may be used in conjunction with an antioxidant, radical scavenger, ultraviolet light stabilizer or ultraviolet light absorber. The amount of the antioxidant, radical scavenger, ultraviolet light stabilizer or ultraviolet light absorber is preferably 0.001 to 20 parts by weight based on 100 parts by weight of the total of all the polymerizable monomers.

Out of the above stabilizers, a hindered amine light stabilizer is a particularly useful stabilizer when the curable composition of the present invention is used as a coating material because it prevents the deterioration of the photochromic compound at the time of curing the curable composition or improves the durability of its cured product. The hindered amine light stabilizer is defined as a compound other than the amine compound of the present invention. Any known compound may be used if it is a compound defined as a hindered amine compound.

When the curable composition is used as a coating material, compounds which have the effect of preventing the deterioration of the photochromic compound include bis(1,2,2,6,6-pentamethyl-4-piperidyl)sebacate and Adecastab LA-52, LA-62, LA-77 and LA-82 of Asahi Denka Kogyo K.K. The amount of the compound is 0.001 to 20 parts by weight based on 100 parts by weight of the total of all the polymerizable monomers. When the curable composition is used as a coating material, it is preferably 0.1 to 10 parts by weight, more preferably 1 to 10 parts by weight.

The method of preparing the curable composition of the present invention is not particularly limited and may be carried out by weighing and mixing together predetermined amounts of components. The order of adding the components is not particularly limited. All the components may be added simultaneously, or only monomer components are mixed together and then a photochromic compound and other additives may be added to and mixed with the resulting mixture right before polymerization. As will be described hereinafter, it is preferred to further add a polymerization initiator for polymerization as required.

The curable composition of the present invention preferably has a viscosity at 25° C. of 20 to 500 cp when it is used to coat an optical material, more preferably 50 to 300 cp, particularly preferably 60 to 200 cp.

By controlling the viscosity to the above range, the thickness of the coating layer to be described hereinafter can be easily adjusted to 10 to 100 µm and photochromic properties can be developed to the full.

Although the method of keeping the coating composition is not particularly limited, when it contains both an epoxy-based monomer as radically polymerizable monomers and an amine compound, the epoxy-based monomer and the amine compound are packed separately and mixed together when in use to obtain high keeping stability. In this case, other components may be suitably divided into the above two packages.

The method of obtaining a photochromic cured product by curing the curable composition of the present invention is not particularly limited and a known polymerization method may be employed according to the types of radically polymerizable monomers used. Polymerization can be started by use of a radical polymerization initiator exemplified by peroxides and azo compounds, exposure to ultraviolet light, $\alpha$-ray, $\beta$-ray or $\gamma$-ray, or a combination thereof.

Any known radical polymerization initiator may be used. Typical examples of the thermal polymerization initiator include diacyl peroxides such as benzoyl peroxide, p-chlorobenzoyl peroxide, decanoyl peroxide, lauroyl peroxide and acetyl peroxide; peroxy esters such as t-butyl peroxy-2-ethyl hexanoate, t-butyl peroxydicarbonate, cumyl peroxyneodecanate and t-butyl peroxybenzoate; percarbonates such as diisopropyl peroxydicarbonate, di-2-ethylhexyl peroxydicarbonate and di-sec-butyloxycarbonate; and azo compounds such as 2,2'-azobisisobutyronitrile, 2,2'-azobis(4-dimethylvaleronitrile), 2,2'-azobis(2-methylbutyronitrile) and 1,1'-azobis(cyclohexane-1-carbonitrile).

The amount of the thermal polymerization initiator which differs according to polymerization conditions, the type of the initiator and the types and composition of the polymerizable monomers cannot be limited but it is preferably 0.01 to 10 parts by weight based on 100 parts by weight of the total of all the polymerizable monomers. The above thermal polymerization initiators may be used alone or in combination of two or more.

When the curable composition of the present invention is polymerized by exposure to light such as ultraviolet radiation, benzoin, benzoin methyl ether, benzoin butyl ether, benzophenol, acetophenone, 4,4'-dichlorobenzophenone, diethoxyacetophenone, 2-hydroxy-2-methyl-1-phenylpropan-1-one, benzylmethyl ketal, 1-(4-isopropylphenyl)-2-hydroxy-2-methylpropan-1-one, 1-hydroxycyclohexylphenyl ketone, 2-isopropylthioxanthone, bis(2,6-dimethoxybenzoyl-2,4,4-trimethyl-pentylphosphine oxide, bis(2,4,6-trimethylbenzoyl)-phenylphosphine oxide, 2,4,6-trimethylbenzoyldiphenyl-phosphine oxide or 2-benzyl-2-dimethylamino-1-(4-morpholinophenyl)-butanone-1 is preferably used as a photopolymerization initiator.

The photopolymerization initiator may be used above or in combination of two or more. Further, it may be used with the above thermal polymerization initiator.

The photopolymerization initiator is generally used in an amount of 0.001 to 5 parts by weight based on 100 parts by weight of the total of all the monomers.

The particularly preferred polymerization method comprises curing the curable composition of the present invention which comprises the above photopolymerization initiator by exposure to ultraviolet radiation and then heating it to complete its polymerization.

When the curable composition of the present invention is polymerized by exposure to light such as ultraviolet radiation, any known light source may be used. Illustrative examples of the light source include super high-pressure mercury lamp, high-pressure mercury lamp, low-pressure mercury lamp, xenon lamp, carbon arc, bactericidal lamp, metal halide lamp and electrodeless lamp. The exposure time using the above light source may be suitably determined according to the type, absorption wavelength and sensitivity of the photopolymerization initiator and the thickness of the photochromic layer. When an electron beam is used as the light source, the photochromic layer can be cured without adding a photopolymerization initiator.

Although the curable composition of the present invention can be used alone as a photochromic material by curing using the above polymerization initiator, it is particularly preferably used as a coating material for coating a substrate, for example, an optical substrate, preferably an optical material such as a spectacle lens.

The optical material is not particularly limited and may be a known optical material such as a spectacle lens or window glass for houses and cars.

As the spectacle lens are known plastic spectacle lenses made of (meth)acrylic resins, polycarbonate-based resins, allyl-based resins, thiourethane-based resins, urethane-based resins and thioepoxy-based resins, and glass-based spectacle lenses. When the curable composition of the present invention is used as a coating material for spectacle lenses, though it can be used for any spectacle lenses, it is preferably used as a coating material for plastic spectacles lenses, more preferably as a coating material for spectacle lenses made of (meth)acrylic resins, polycarbonate-based resins, allyl-based resins, thiourethane-based resins, urethane-based resins and thioepoxy-based resins.

When the curable composition of the present invention is used as a coating material for an optical material such as a spectacle lens, after it is applied to the optical material by spin coating, spray coating, dip coating or dip-spin coating, it is preferably cured by exposure to light or by heating, more preferably cured by exposure to light and then heating to complete its polymerization.

When the substrate such as a spectacle lens is to be coated with the curable composition, the substrate is preferably subjected to an atmospheric plasma treatment before coating.

The curable composition subjected to the treatment used for coating is not particularly limited if it comprises a photochromic compound and is curable by heating and exposure to ultraviolet radiation or visible radiation and a known coating composition may be used. It is preferably a composition which comprises radically polymerizable monomers as the main ingredients and a photochromic compound in an amount of 0.01 to 20 parts by mass based on 100 parts by mass of the total of all the radically polymerizable monomers. It is more preferably a curable composition which comprises a photochromic compound in an amount of 0.01 to 20 parts by mass and an amine compound in an amount of 0.01 to 20 parts by mass based on 100 parts by mass of the total of all the radically polymerizable monomers. It is much more preferably the above curable composition of the present invention which comprises either one of a radically polymerizable monomer having a silanol group, a radically polymerizable monomer having a group capable of forming a silanol group by hydrolysis and a radically polymerizable monomer having an isocyanate group in the radically polymerizable monomers.

When the plasma treatment is carried out at a pressure other than the atmospheric pressure like a vacuum plasma treatment, the surface of the resin substrate is not uniformly treated and becomes uneven disadvantageously. Since the air tightness of the apparatus is required in this case, the production system becomes relatively bulky, which is disadvantageous from an economical point of view.

The atmospheric plasma treatment is a treatment which is generally carried out at a higher pressure than a low-pressure plasma treatment and its pressure is higher than about 1 torr which is the pressure of the low-pressure plasma treatment. It generally means that the treatment is carried out at the atmospheric pressure on the surface of the earth, about 760 torr, which is slightly different according to altitude.

Any known introduction gas may be used as the gas used in the atmospheric plasma treatment. Examples of the introduction gas include air, nitrogen, oxygen, hydrogen, carbon dioxide, carbon monoxide, sulfur dioxide, argon, helium, neon, ammonia, chlorine, nitrogen monoxide, nitrogen dioxide and fluorocarbon-based gases such as $CF_4$ and $C_2F_6$. Air or nitrogen is preferred from the viewpoints of handling ease and cost.

The relative humidity of the introduction gas used in the atmospheric plasma treatment is preferably 80% RH or less, more preferably 40% RH or less at 24° C., which differs according to other conditions. The temperature for determining the relative humidity is 24° C. but this does not mean that the temperature of the introduction gas used for the atmospheric plasma is limited. Further, the relative humidity condition given herein of the introduction gas is a relative humidity before the gas is introduced into the atmospheric plasma irradiation device. By setting the relative humidity to the above value, the effect of improving adhesion by the atmospheric plasma treatment becomes extremely large.

The method of producing the introduction gas having the above relative humidity is not particularly limited. When gas other than the ambient air is used, it has the above relative humidity or less when it is taken out from a commercially available gas cylinder. When the ambient air is used, untreated air at a place where an atmospheric plasma irradiation device is installed is used directly or after it is compressed by a compressor and let pass through a water absorption pipe filled with a suitable amount of a moisture absorbent such as calcium chloride or silica gel to adjust its relative humidity. As a matter of course, if the relative humidity of the ambient air is sufficiently low, the air does not need to be let pass through the water absorption pipe.

The temperature of the introduction gas used in the atmospheric plasma treatment is not particularly limited but preferably in the range of −5 to 100° C., more preferably 5 to 60° C.

The plasma irradiating method in the atmospheric plasma treatment is not particularly limited but the following method is preferred. For example, (1) a resin substrate is mounted to a spin coating device and plasma is irradiated while the resin substrate is rotated, (2) a resin substrate is mounted below a fixed plasma irradiation unit and moved in horizontal and vertical directions automatically or manually so that the surface of the resin substrate is uniformly treated with plasma, or (3) a resin substrate is fixed and a plasma irradiation unit is moved in horizontal and vertical directions automatically or manually so that the surface of the resin substrate is uniformly treated with plasma.

In the atmospheric plasma treatment, a mesh-like sheet made of metal (including an alloy) such as iron, copper, aluminum, stainless steel or SUS may be inserted into a gap between the resin substrate and the plasma irradiation unit. By using this mesh-like sheet, the discharge or deterioration by heat of the surface of the resin substrate subjected to the atmospheric plasma treatment can be reduced and the atmospheric plasma treatment can be carried out efficiently without deteriorating the surface of the resin substrate. Further, when the mesh-like sheet is used, relatively high adhesion can be obtained without the step of cleaning with water or an organic solvent after the atmospheric plasma treatment to be described hereinafter.

Although the surface of the resin substrate may be coated with the curable composition containing a photochromic compound directly after the above atmospheric plasma treatment, the surface subjected to the atmospheric plasma treatment of the resin substrate is preferably cleaned with a solvent (to be referred to as "cleaning solvents" hereinafter) before coating. This cleaning makes it easier to ensure adhesion between the surface of the resin substrate and the cured product. Cleaning with this cleaning solvent is particularly effective when the above metal mesh-like sheet is not used in the atmospheric plasma treatment.

Examples of the cleaning solvent include water; organic solvents miscible with water in a desired ratio at normal temperature exemplified by alcohols such as methanol, ethanol and isopropanol, ethers such as tetrahydrofuran and dioxane, acetonitrile and acetone; and other organic solvents such as 1-butyl alcohol, 2-butyl alcohol, methyl acetate, ethyl acetate, diethyl ether, hexane and toluene.

Although these cleaning solvents may be used alone or in combination of two or more, it is extremely preferred that water be contained as one component of the cleaning solvent to improve adhesion. Water is the most preferably used because the effect of improving adhesion is obtained with high reproducibility and drainage is extremely easy.

In the case of a mixed solvent of water and an organic solvent, the mixed solvent in a state that the organic solvent is uniformly mixed with water can be particularly preferably used. To prepare this uniform mixed solvent of water and an organic solvent, a water-soluble organic solvent which is miscible with water in a desired ratio at normal temperature is preferably used as the organic solvent. Preferred examples of the water-soluble organic solvent include methanol, ethanol and acetone from the viewpoint of handling ease and damage to organisms.

When the cleaning solvent in the present invention is water or a uniform mixed solvent of water and an organic solvent, the weight ratio of water to the organic solvent is preferably 100/0 to 1/99, more preferably 100/0 to 15/85.

As the organic solvent used in the cleaning solvent in the present invention may be used a commercially available solvent for industrial use without purifying it and as the water may be used tap water, ion exchange water, distilled water or pure water.

The temperature of the cleaning solvent used in the present invention, which differs according to the resin substrate used, the type of water or an organic solvent used for cleaning or their mixing ratio, is preferably −5 to 100° C., more preferably 5 to 80° C.

To clean the surface of the resin substrate with a cleaning solvent after the atmospheric plasma treatment, any known method may be used. Preferred examples of the cleaning method include (1) cleaning with cloth imbibed with a cleaning solvent, (2) ultrasonic cleaning, and (3) cleaning with a spin coating device. Stated more specifically, the method (1) comprises impregnating cloth with a suitable amount of a cleaning solvent and wiping the surface of the resin substrate subjected to the atmospheric plasma treatment with this cloth to clean it, the method (2) comprises pouring a cleaning solvent into a vessel and immersing the resin substrate subjected to the atmospheric plasma treatment in the vessel to clean it with ultrasonic waves, and the method (3) comprises mounting the resin substrate which has been subjected to the atmospheric plasma treatment to a spin coating device, applying (dropping) a suitable amount of a cleaning solvent to the surface of the resin substrate and turning the resin substrate to clean it.

The number of times of cleaning in the above cleaning methods is not particularly limited but preferably 0 to 10, more preferably 1 to 5 from the viewpoint of productivity. The above cleaning methods (1) to (3) may be used in combination of two or more for a single resin substrate subjected to the atmospheric plasma treatment. Further, when cleaning is carried out a plurality of times, a different cleaning solvent may be used each time cleaning is carried out.

The cleaning time which differs according to the types, amounts and temperatures of the resin substrate and the cleaning solvent used and the cleaning method is preferably 1 second to 30 minutes, more preferably 3 seconds to 10 minutes.

In the above methods, the surface of the resin substrate subjected to the atmospheric plasma treatment is further cleaned with a cleaning solvent as required and coated with a curable coating composition containing a photochromic compound and then the coating composition is cured to obtain satisfactory adhesion. Preferably, the resin substrate may be treated with an alkali solution before or after the plasma treatment of the resin substrate as required to further improve adhesion. The alkali solution is preferably an aqueous solution of sodium hydroxide or an aqueous solution of potassium hydroxide. The concentration of the hydroxide is preferably 5 to 30 parts by mass. The temperature is not particularly limited and may be suitably determined in consideration of the heat resistance of the substrate used. However, it is preferably 20 to 60° C. As for the treatment method, the resin substrate is imbibed with the alkali solution or cleaned with ultrasonic waves while it is imbibed with the alkali solution. The treatment time which differs according to treatment conditions is preferably 1 minute to 1 hour, more preferably 5 to 15 minutes. The alkali solution may be a mixed solution of water and an alcohol solvent or an alcohol solution, besides the above aqueous solutions. The alcohol used is a lower alcohol such as methanol, ethanol or isopropyl alcohol and an organic base such as 1-methyl-2-pyrrolidone may be added as an additive in an amount of 1 to 10 parts by mass based on 100 parts by mass of the alkali solution.

Although the thickness of the coating layer obtained by curing by the above method is not particularly limited, the thickness is preferably relatively large because sufficient color development intensity is obtained even when the concentration of the photochromic compound is low and the durability of photochromic properties is satisfactory. However, as the thickness of the coating layer increases, the initial yellowness becomes stronger. Therefore, the thickness of the coating layer is preferably 10 to 100 µm, more preferably 20 to 50 µm. The thickness of the coating layer can be easily adjusted to this range by setting the viscosity at 25° C. of the curable composition to 20 to 500 cp, preferably 50 to 300 cp, more preferably 60 to 200 cp as described above. Conventionally known coating compositions (comprising no silyl monomer and no photochromic material) contain a solvent to obtain a uniform film and therefore have a viscosity of 5 cp or less, and the thickness of a coating layer obtained from each of the compositions is several micrometers or less.

When the curable composition of the present invention is used as a coating material for a spectacle lens, the blending ratio of components, particularly radically polymerizable monomers is preferably adjusted such that the refractive index of the obtained cured product becomes almost equal to the refractive index of the spectacle lens. In general, the refractive index is adjusted to about 1.48 to 1.75.

When the curable composition of the present invention comprises the above silyl monomer and/or isocyanate monomer and the above amine compound and is used as a coating material for an optical material such as a spectacle lens, particularly a plastic spectacle lens, it exhibits extremely high adhesion to the optical material.

Although the thus coated optical material can be directly used as a photochromic optical material, it is more preferably further coated with a hard coat material. The scratch resistance of the photochromic optical material can be improved by coating with the hard coat material.

Any known hard coat material may be used, as exemplified by silane coupling agents, hard coat agents essentially composed of a sol of a silicon, zirconium, antimony or aluminum oxide, and hard coat agents essentially composed of an organic polymer.

The curable composition of the present invention is extremely useful because it has high adhesion to a hard coat agent which is cured by a condensation method and has been difficult to be used with conventionally known compositions due to poor adhesion.

The surface of a cured product of the curable composition alone of the present invention, the cured surface of the curable composition of the present invention used as a coating material for an optical material or the cured and hard coated surface of the curable composition used as a coating material for an optical material may be further subjected to an anti-reflection treatment by depositing a metal oxide thin film such as a $SiO_2$, $TiO_2$ or $ZrO_2$ film or applying an organic polymer thin film, antistatic treatment and secondary treatment.

EXAMPLES

The following examples are provided for the purpose of further illustrating the present invention but are in no way to be taken as limiting.

The abbreviations and names of the compounds used are given below. As for the other radically polymerizable monomers, the L-scale Rockwell hardness of a cured product obtained by cast homopolymerizing (the temperature was raised from 30 to 90° C. in 20 hours and polymerization was carried out at 120° C. for 2 hours) each compound (monomer) is given as "homo-HL" within the parentheses. As for the method of measuring the hardness, after the cured product, was kept in a chamber maintained at 25° C. for 1 day, its L-scale Rockwell hardness was measured with the Akashi Rockwell hardness meter (Model: AR-10). Glycidyl methacrylate is an epoxy-based monomer.

(1) Radically Polymerizable Monomers silyl monomer

TMSiMA: γ-methacryloyloxypropyl trimethoxysilane

DMSiMA: γ-methacryloyloxypropyl methyldimethoxysilane isocyanate monomer

MOI: 2-isocyanatoethoxy methacrylate other radically polymerizable monomers

TMPT: trimethylolpropane trimethacrylate (homo-HL=122)

DPEHA: dipentaerythritol hexaacrylate (homo-HL=100)

U6A: urethane oligomer hexaacrylate (homo-HL=100) (U-6HA of Shin Nakamura Kagakusha Co., Ltd.)

EB6A: polyester oligomer hexaacrylate (homo-HL=100) (EB1830 of Daicel UCB Co., Ltd.)

GMA: glycidyl methacrylate (homo-HL=80)

BPE: 2,2-bis(4-methacryloyloxyethoxyphenyl)propane (homo-HL=110)

9GDA9GA: polyethylene glycol diacrylate having an average molecular weight of 532 (homo-HL<20)

MePEGMA (475): methyl ether polyethylene glycol methacrylate having an average molecular weight of 1,000 (homo-HL<20)

BPE oligo: 2,2-bis(4-acryloyloxypolyethylene glycolphenyl)propane having an average molecular weight of 776 (homo-HL<40)

(2) Amine Compound

NMDEA: N-methyldiethanolamine

DMEMA: N,N-dimethylaminoethyl methacrylate

(3) Photochromic Compound chromene 1

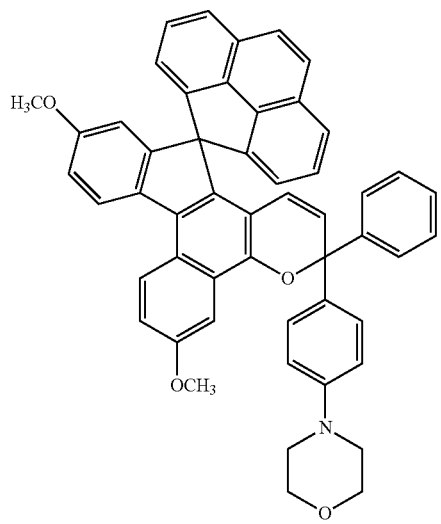

chromene 4

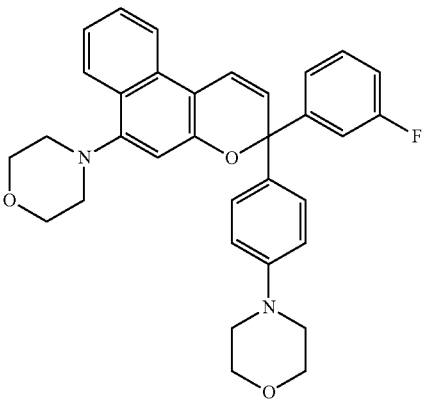

chromene 5

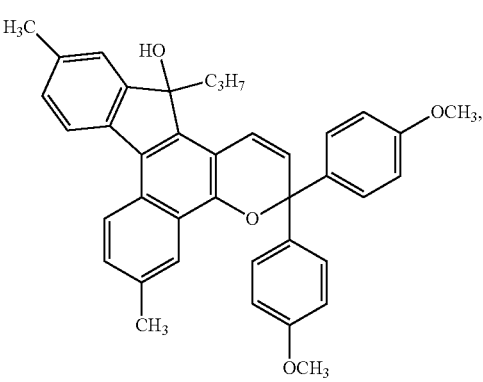

chromene 2

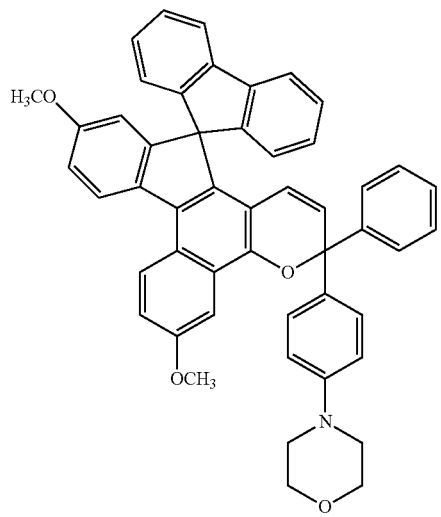

chromene 6

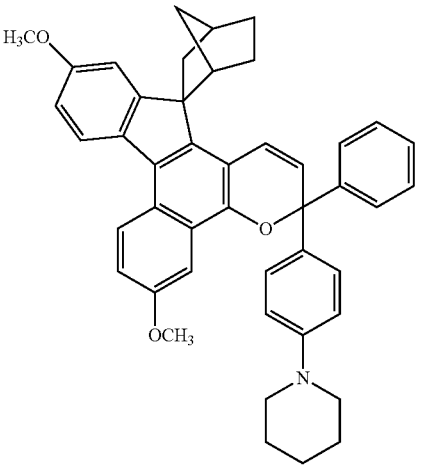

chromene 3

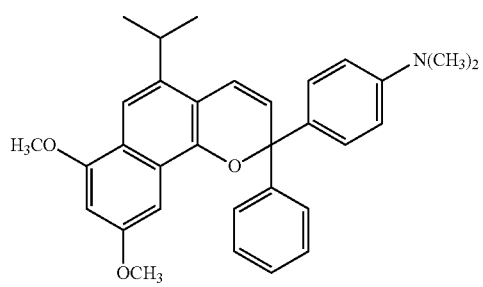

(4) Polymerization Initiator
CGI184: 1-hydroxycyclohexylphenyl ketone
CTX: 2-chlorothioxanthone
CGI403: bis(2,6-dimethoxybenzoyl-2,4,4-trimethyl-pentylphosphine oxide)

(5) Hard Coat Solution
TS56H (condensation type hard coat material manufactured by Tokuyama Corporation)

(6) Stabilizer
LS765: bis(1,2,2,6,6-pentamethyl-4-piperidyl)sebacate (7) Optical Material
CR39 (allyl-based resin plastic lens; refractive index=1.50)
MR (thiourethane-based resin plastic lens; refractive index=1.60)

TE (thioepoxy-based resin plastic lens; refractive index=1.71)
PC (polycarbonate resin plastic lens; refractive index=1.59)
SPL (methacrylic resin plastic lens; refractive index=1.54)

Example 1

3 parts by weight of chromene 1, 5 parts by weight of N-methyldiethanolamine, 5 parts by weight of LS765, and 0.4 part by weight of CGI184 and 0.1 part by weight of CGI403 as polymerization initiators were added to and fully mixed with 100 parts by weight of polymerizable monomers consisting of 5 parts by weight of γ-methacryloyloxypropyl trimethoxysilane, 20 parts by weight of trimethylolpropane trimethacrylate, 35 parts by weight of 2,2-bis(4-methacryloyloxyethoxyphenyl)propane, 10 parts by weight of urethane oligomer hexaacrylate, 20 parts by weight of polyethylene glycol diacrylate having an average molecular weight of 532 and 10 parts by weight of glycidyl methacrylate. The kinematic viscosity of this mixed solution was measured with a Cannon-Fenske viscometer at 25° C. in accordance with JISK2283. When the viscosity of the sample was calculated from the obtained kinematic viscosity and the measured specific gravity of the sample according to the formula [viscosity (cP)=kinematic viscosity (cSt)×specific gravity (g/cm$^3$)], it was 81 cP.

Subsequently, about 2 g of the mixed solution obtained by the above method was spin-coated on the surface of a 2 mm-thick plastic lens (CR39) using the 1H-DX2 spin coater of MIKASA Co., Ltd. at a revolution of 60 rpm for 40 seconds, 500 rpm for 2 seconds and 1,000 rpm for 2 seconds. This coated lens was exposed by a metal halide lamp having an output of 120 mW/cm$^2$ in a nitrogen gas atmosphere for 2 minutes to cure the coating film. Thereafter, the lens was heated at 120° C. for 3 hours. The plastic lens used was a plastic lens subjected to a corona discharge treatment using the Corojet 1000 of Kyoto Denki Kiki Co., Ltd. to modify its surface.

The obtained lens having a photochromic coating layer was used as a sample to measure its maximum absorption wavelength, color development intensity, fading speed, durability, yellowness, adhesion between the lens and the photochromic coating layer and the thickness of the coating layer by the following methods.

(1) maximum absorption wavelength (λmax): The obtained lens having a photochromic coating layer was exposed by the L-2480 (300 W) SHL-100 xenon lamp of Hamamatsu Photonics Co., Ltd. through an aeromass filter (of Corning Co., Ltd.) at a beam intensity on the surface of the polymer of 365 nm=2.4 mW/cm$^2$ and 245 nm=24 μW/cm$^2$ and a temperature of 20° C.±1° C. for 120 seconds to develop color and the maximum absorption wavelength was obtained by the spectrophotometer (MCPD1000 instantaneous multichannel photodetector) of Otsuka Denshi Kogyo Co., Ltd. The maximum absorption wavelength is connected with the tone of developed color.

(2) color development intensity: The difference {ε(120)-ε(0)} between absorbance {ε(120)} after 120 seconds of exposure at the above maximum absorption wavelength and absorbance {ε(0)} at the above wavelength of a cured product which was not exposed was obtained and taken as color development intensity. As this value increases, photochromic properties becomes better.

(3) fading speed: The time {t½ (min)} required until the absorbance at the above maximum wavelength of the cured product dropped to ½ of {ε(120)-ε(0)} when irradiation was stopped after 120 seconds of exposure was measured. As this time becomes shorter, photochromic properties becomes better.

(4) durability: The following deterioration promotion test was conducted to evaluate the durability of color development by exposure. That is, the deterioration of the obtained lens having a photochromic coating layer was promoted by the X25 xenon weather meter of Suga Shikenki Co., Ltd. for 200 hours. Thereafter, the above evaluation of color development intensity was carried out before and after the test to measure color development intensity ($A_0$) before the test and color development intensity ($A_{200}$) after the test. The residual rate (%) was obtained from {($A_{200}/A_0$)×100} and used as an index of color development durability. As the residual rate increases, the color development durability becomes higher.

(5) yellowness (YI): The yellowness before the color development of the lens sample was measured using the color difference meter (SM-4) of Suga Shikenki Co., Ltd. As the YI value increases, the yellowness becomes stronger.

(6) color development uniformity: The lens sample was caused to develop color by sunlight outdoors and whether color development was uniform or not was evaluated visually. ○ indicates that no color development nonuniformity was seen and X indicates that color development nonuniformity was seen.

(7) adhesion between lens and photochromic coating layer (adhesion 1): The coating layer formed surface of the lens having a photochromic coating layer was cut in 100 1 mm×1 mm squares with a sharp cutter knife, and commercially available Cellotape was affixed to the surface and stripped quickly from the sample to check the stripping of the coating layer (coating film) visually. When all of the squares were unremoved, adhesion was evaluated as ○, when some of the squares were removed, adhesion was evaluated as Δ, and when all of the squares were removed, adhesion was evaluated as X.

(8) thickness of photochromic coating layer: The lens having a photochromic coating layer was cut with a diamond cutter and the cut section was photographed by a CCD camera to evaluate its thickness.

Subsequently, the lens having a photochromic coating layer obtained by the above method was rinsed in acetone and dried fully with air to be cleaned, immersed in a 10% aqueous solution of NaOH for 10 minutes, rinsed in water fully and dried with air again. This lens was immersed in the TS56H hard coat solution, pulled up at a rate of 30 mm/min, pre-dried at 60° C. for 15 minuets and then cured by heating at 130° C. for 2 hours to prepare a sample having a hard coat layer. This sample was evaluated for adhesion between a photochromic coating layer and a hard coat material, scratch resistance and the dissolution of the photochromic compound into the hard coat layer.

(9) adhesion between photochromic coating layer and hard coat material (adhesion 2): The photochromic layer formed surface (covered with a hard coat layer) of the hard coated lens was cut in 100 1 mm×1 mm squares with a sharp cutter knife, and commercially available Cellotape was affixed to the surface and stripped quickly from the sample to check the stripping of the hard coat layer and the photochromic coating layer visually. When all of the squares were unremoved, adhesion was evaluated as ○, when some of the squares were removed, adhesion was evaluated as Δ, and when all of the squares were removed, adhesion was evaluated as X.

(10) scratch resistance: #0000 steel wool was set in the scratch resistance tester of Fukuda Kikai Kogyo Co., Ltd.

and the sample was rubbed by moving the steel wool back and forth 10 times over the surface thereof under a load of 1 kg to inspect the scratch resistance of the sample visually. The scratch resistance of the sample was evaluated based on six criteria S and A to E (S: the surface of the sample is not scratched at all, A: the surface is slightly scratched, E: the surface of a polyallyl diethylene glycol carbonate lens without a hard coat layer is badly scratched).

(11) dissolution of photochromic compound into hard coat solution: The lens having a hard coat layer obtained by the above method was inspected visually to check whether the photochromic compound was dissolved into the hard coat layer. ○ indicates that discoloration caused by the dissolution into the hard coat solution was not seen and X indicates that discoloration was seen.

As a result, the sample had a λmax of 610 nm, a color development intensity of 0.77, a fading speed of 1.2 minutes, a durability of 45% and a yellowness (YI) of 13, and adhesion between the coating layer and the substrate was evaluated as ○, the thickness of the coating layer was 30 μm, adhesion between the coating layer and the hard coat layer was evaluated as ○, scratch resistance was evaluated as A, and dissolution into the hard coat solution was evaluated as ○.

Examples 2 to 25

Cured products having a photochromic coating layer were obtained from the curable composition of the present invention in the same manner as in Example 1 using radically polymerizable monomers, chromene compound and other additives shown in Table 1, and their characteristic properties were evaluated. The amounts (parts) of an amine compound, polymerization initiator, stabilizer and photochromic compound in Table 1 and Table 3 are amounts (parts by weight) based on 100 parts by weight of the total of all the radically polymerizable monomers. The results are shown in Table 2.

TABLE 1

| Ex. No. | Silyl monomer/ isocyanate monomer (parts by weight) | other radically polymerizable monomers (parts by weight) | amine compound (parts) | polymerization initiator (parts) | stabilizer (parts) | chromene compound (parts) | viscosity at 25° C. (cp) |
|---|---|---|---|---|---|---|---|
| 1 | TMSiMA 5 | TMPT/BPE/U6A/9GA/GMA 20/35/10/20/10 | NMDEA 5 | CGI184/CGI403 0.4/0.1 | LS765 5 | chromene 1 3 | 81 |
| 2 | TMSiMA 0.1 | TMPT/BPE/U6A/9GA/GMA 20/39.9/10/20/10 | NMDEA 5 | CGI184/CGI403 0.4/0.1 | LS765 5 | chromene 1 3 | 83 |
| 3 | TMSiMA 1 | TMPT/BPE/U6A/9GA/GMA 20/39/10/20/10 | NMDEA 5 | CGI184/CGI403 0.4/0.1 | LS765 5 | chromene 1 3 | 83 |
| 4 | TMSiMA 10 | TMPT/BPE/U6A/9GA/GMA 20/30/10/20/10 | NMDEA 5 | CGI184/CGI403 0.4/0.1 | LS765 5 | chromene 1 3 | 80 |
| 5 | TMSiMA 20 | TMPT/BPE/U6A/9GA/GMA 20/20/10/20/10 | NMDEA 5 | CGI184/CGI403 0.4/0.1 | LS765 5 | chromene 1 3 | 78 |
| 6 | TMSiMA 30 | TMPT/BPE/U6A/9GA/GMA 20/10/10/20/10 | NMDEA 5 | CGI184/CGI403 0.4/0.1 | LS765 5 | chromene 1 3 | 75 |
| 7 | DMSiMA 5 | TMPT/BPE/U6A/9GA/GMA 20/35/10/20/10 | NMDEA 5 | CGI184/CGI403 0.4/0.1 | LS765 5 | chromene 1 3 | 80 |
| 8 | TMSiMA 5 | TMPT/BPE/U6A/9GA/GMA 20/35/10/20/10 | NMDEA 1 | CGI184/CGI403 0.4/0.1 | LS765 5 | chromene 1 3 | 80 |
| 9 | TMSiMA 5 | TMPT/BPE/U6A/9GA/GMA 20/35/10/20/10 | NMDEA 10 | CGI184/CGI403 0.4/0.1 | LS765 5 | chromene 1 3 | 82 |
| 10 | TMSiMA 5 | TMPT/BPE/U6A/9GA/GMA 20/35/10/20/10 | DMEMA 5 | CGI184/CGI403 0.4/0.1 | LS765 5 | chromene 1 3 | 80 |
| 11 | TMSiMA 5 | TMPT/BPE/U6A/9GA/GMA 20/35/10/20/10 | DMEMA 20 | CGI184/CGI403 0.4/0.1 | LS765 5 | chromene 1 3 | 76 |
| 12 | TMSiMA 5 | TMPT/BPE/U6A/9GA/GMA 20/35/10/20/10 | NMDEA 5 | CGI184/CGI403 0.4/0.1 | LS765 5 | chromene 1 3 | 80 |
| 13 | TMSiMA 5 | TMPT/BPE oligo/EB6A/9GA/GMA 20/35/10/20/10 | NMDEA 5 | CGI184/CGI403 0.4/0.1 | LS765 5 | chromene 1 3 | 89 |
| 14 | TMSiMA 5 | DPEHA/BPE oligo/EB6A/9GA/GMA 20/35/10/20/10 | NMDEA 5 | CGI184/CGI403 0.4/0.1 | LS765 5 | chromene 1 3 | 89 |
| 15 | TMSiMA 5 | DPEHA/BPE oligo/U6A/9GA/GMA 20/35/10/20/10 | NMDEA 5 | CGI184/CTX 0.4/0.1 | LS765 5 | chromene 1 3 | 89 |
| 16 | MOI 0.1 | TMPT/BPE/U6A/9GA/GMA 20/39.9/10/20/10 | NMDEA 5 | CGI184/CGI403 0.4/0.1 | LS765 5 | chromene 1 3 | 80 |
| 17 | MOI 5 | TMPT/BPE/U6A/MePEGMA/GMA 20/35/10/20/10 | DMEMA 5 | CGI184/CGI403 0.4/0.1 | LS765 5 | chromene 1 3 | 78 |
| 18 | MOI 30 | TMPT/BPE/U6A/9GA/GMA 20/10/10/20/10 | NMDEA 5 | CGI184/CGI403 0.4/0.1 | LS765 5 | chromene 1 3 | 75 |
| 19 | DMSiMA 5 | TMPT/BPE/U6A/MePEGMA/GMA 20/35/10/20/10 | NMDEA 5 | CGI184/CGI403 0.4/0.1 | LS765 5 | chromene 2 3 | 80 |
| 20 | DMSiMA 5 | TMPT/BPE/U6A/MePEGMA/GMA 20/35/10/20/10 | NMDEA 5 | CGI184/CGI403 0.4/0.1 | LS765 5 | chromene 3 3 | 80 |
| 21 | DMSiMA 5 | TMPT/BPE/U6A/MePEGMA/GMA 20/35/10/20/10 | NMDEA 5 | CGI184/CGI403 0.4/0.1 | LS765 5 | chromene 4 3 | 80 |
| 22 | DMSiMA 5 | TMPT/BPE/U6A/MePEGMA/GMA 20/35/10/20/10 | NMDEA 5 | CGI184/CGI403 0.4/0.1 | LS765 5 | chromene 5 3 | 80 |
| 23 | DMSiMA 5 | TMPT/BPE/U6A/MePEGMA/GMA 20/35/10/20/10 | NMDEA 5 | CGI184/CGI403 0.4/0.1 | LS765 5 | chromene 6 3 | 80 |

TABLE 1-continued

| Ex. No. | Silyl monomer/ isocyanate monomer (parts by weight) | other radically polymerizable monomers (parts by weight) | amine compound (parts) | polymerization initiator (parts) | stabilizer (parts) | chromene compound (parts) | viscosity at 25° C. (cp) |
|---|---|---|---|---|---|---|---|
| 24 | TMSiMA/MOI 3/2 | TMPT/BPE/U6A/MePEGMA/GMA 20/35/10/20/10 | NMDEA 5 | CGI184/CGI403 0.4/0.1 | LS765 5 | chromene 2 3 | 80 |
| 25 | TMSiMA 5 | TMPT/BPE/U6A/9GA 20/35/10/30 | NMDEA 5 | CGI184/CGI403 0.4/0.1 | LS765 5 | chromene 1 3 | 90 |

Ex.: Example

TABLE 2

| Ex. No. | λmax (nm) | Color development intensity | fading speed (min) | durability (%) | yellowness YI | color development uniformity | adhesion 1 (substrate) | film thickness (μm) | adhesion 2 (hard coat) | scratch resistance | dissolution into hard coat solution |
|---|---|---|---|---|---|---|---|---|---|---|---|
| 1 | 610 | 0.77 | 1.2 | 45 | 13 | ○ | ○ | 30 | ○ | A | ○ |
| 2 | 610 | 0.77 | 1.2 | 45 | 13 | ○ | Δ | 35 | Δ | C | ○ |
| 3 | 610 | 0.8 | 1 | 45 | 13 | ○ | ○ | 32 | ○ | A | ○ |
| 4 | 610 | 0.7 | 1.5 | 40 | 13 | ○ | ○ | 25 | ○ | A | ○ |
| 5 | 610 | 0.65 | 1.8 | 40 | 13 | ○ | ○ | 22 | ○ | A | ○ |
| 6 | 610 | 0.55 | 3 | 36 | 13 | ○ | ○ | 18 | ○ | A | ○ |
| 7 | 610 | 0.76 | 1.2 | 45 | 13 | ○ | ○ | 30 | ○ | A | ○ |
| 8 | 610 | 0.72 | 1.1 | 45 | 12.8 | ○ | ○ | 30 | ○ | A | ○ |
| 9 | 610 | 0.82 | 0.9 | 40 | 13.5 | ○ | ○ | 30 | ○ | A | ○ |
| 10 | 610 | 0.72 | 1.3 | 45 | 13 | ○ | ○ | 30 | ○ | A | ○ |
| 11 | 610 | 0.65 | 1.8 | 41 | 13 | ○ | ○ | 28 | ○ | A | ○ |
| 12 | 610 | 0.78 | 1.2 | 46 | 13 | ○ | ○ | 30 | ○ | A | ○ |
| 13 | 610 | 0.9 | 1 | 45 | 13 | ○ | ○ | 35 | ○ | A | ○ |
| 14 | 610 | 0.92 | 1.1 | 44 | 13 | ○ | ○ | 35 | ○ | A | ○ |
| 15 | 610 | 0.71 | 1.4 | 39 | 13 | ○ | ○ | 35 | ○ | A | ○ |
| 16 | 610 | 0.68 | 1.5 | 39 | 13 | ○ | Δ | 30 | Δ | C | ○ |
| 17 | 610 | 0.62 | 1.9 | 38 | 13.5 | ○ | ○ | 28 | ○ | B | ○ |
| 18 | 610 | 0.42 | 3.5 | 28 | 14 | ○ | ○ | 26 | ○ | B | ○ |
| 19 | 600 | 0.7 | 1.4 | 43 | 10.5 | ○ | ○ | 30 | ○ | A | ○ |
| 20 | 588 | 0.7 | 1.8 | 39 | 9 | ○ | ○ | 30 | ○ | A | ○ |
| 21 | 474 | 0.9 | 1.6 | 35 | 21 | ○ | ○ | 30 | ○ | A | ○ |
| 22 | 576 | 0.8 | 1.5 | 40 | 10 | ○ | ○ | 30 | ○ | A | ○ |
| 23 | 580 | 0.8 | 1 | 47 | 13 | ○ | ○ | 30 | ○ | A | ○ |
| 24 | 600 | 0.63 | 1.6 | 40 | 10.5 | ○ | ○ | 30 | ○ | A | ○ |
| 25 | 610 | 0.2 | 1.2 | 5 | 20 | ○ | Δ | 35 | ○ | B | ○ |

Ex. Example

Comparative Examples 1 to 12

Photochromic cured products were obtained in the same manner as in Example 1 except that polymerizable monomers and chromene compound shown in Table 3 were used for comparison, and their characteristic properties were evaluated. The result are shown in Table 4.

TABLE 3

| C. Ex. No. | Silyl monomer/ isocyanate monomer (parts by weight) | other radically polymerizable monomers (parts by weight) | amine compound (parts) | polymerization initiator (parts) | stabilizer (parts) | chromene compound (parts) | viscosity at 25° C. (cp) |
|---|---|---|---|---|---|---|---|
| 1 | — | TMPT/BPE/U6A/9GA/GMA 20/40/10/20/10 | — | CGI184/CGI403 0.4/0.1 | LS765 5 | chromene 1 3 | 85 |
| 2 | — | TMPT/BPE/U6A/9GA/GMA 20/40/10/20/10 | NMDEA 5 | CGI184/CGI403 0.4/0.1 | LS765 5 | chromene 1 3 | 85 |
| 3 | TMSiMA 5 | TMPT/BPE/U6A/9GA/GMA 20/35/10/20/10 | — | CGI184/CGI403 0.4/0.1 | LS765 5 | chromene 1 3 | 80 |
| 4 | TMSiMA 5 | TMPT/BPE/U6A/9GA/GMA 20/35/10/20/10 | NMDEA 0.005 | CGI184/CGI403 0.4/0.1 | LS765 5 | chromene 1 3 | 80 |
| 5 | TMSiMA 5 | TMPT/BPE/U6A/9GA/GMA 20/35/10/20/10 | NMDEA 40 | CGI184/CGI403 0.4/0.1 | LS765 5 | chromene 1 3 | 80 |
| 6 | MOI 5 | TMPT/BPE/U6A/9GA/GMA 20/35/10/20/10 | — | CGI184/CGI403 0.4/0.1 | LS765 5 | chromene 1 3 | 78 |
| 7 | — | TMPT/BPE/U6A/MePEGMA/GMA 20/35/10/20/10 | — | CGI184/CGI403 0.4/0.1 | LS765 5 | chromene 2 3 | 85 |

TABLE 3-continued

| C. Ex. No. | Silyl monomer/ isocyanate monomer (parts by weight) | other radically polymerizable monomers (parts by weight) | amine compound (parts) | polymerization initiator (parts) | stabilizer (parts) | chromene compound (parts) | viscosity at 25° C. (cp) |
|---|---|---|---|---|---|---|---|
| 8 | — | TMPT/BPE/U6A/MePEGMA/GMA 20/35/10/20/10 | — | CGI184/CGI403 0.4/0.1 | LS765 5 | chromene 3 3 | 85 |
| 9 | — | TMPT/BPE/U6A/MePEGMA/GMA 20/35/10/20/10 | — | CGI184/CGI403 0.4/0.1 | LS765 5 | chromene 4 3 | 85 |
| 10 | — | TMPT/BPE/U6A/MePEGMA/GMA 20/35/10/20/10 | — | CGI184/CGI403 0.4/0.1 | LS765 5 | chromene 5 3 | 85 |
| 11 | — | TMPT/BPE/U6A/MePEGMA/GMA 20/35/10/20/10 | — | CGI184/CGI403 0.4/0.1 | LS765 5 | chromene 6 3 | 85 |
| 12 | — | BPE/9GA 50/50 | — | CGI184/CGI403 0.4/0.1 | LS765 5 | chromene 1 3 | 85 |

C. Ex.: Comparative Example

TABLE 4

| C. Ex. No. | λmax (nm) | Color development intensity | fading speed (min) | durability (%) | yellowness YI | color development uniformity | adhesion 1 (substrate) | adhesion 2 (hard coat) | scratch resistance | dissolution into hard coat solution |
|---|---|---|---|---|---|---|---|---|---|---|
| 1 | 610 | 0.75 | 1.1 | 45 | 12 | ○ | X | X | C | ○ |
| 2 | 610 | 0.8 | 1 | 45 | 13 | ○ | X | X | C | ○ |
| 3 | 610 | 0.75 | 1.2 | 45 | 12 | ○ | X | Δ | B | ○ |
| 4 | 610 | 0.75 | 1.2 | 45 | 12.5 | ○ | X | ○ | B | ○ |
| 5 | 610 | 0.9 | 0.9 | 25 | 20 | ○ | X | X | C | ○ |
| 6 | 610 | 0.6 | 1.9 | 38 | 13 | ○ | X | Δ | C | ○ |
| 7 | 600 | 0.7 | 1.4 | 42 | 10.5 | ○ | X | X | C | ○ |
| 8 | 588 | 0.7 | 1.8 | 39 | 9 | ○ | X | X | C | ○ |
| 9 | 474 | 0.9 | 1.6 | 35 | 21 | ○ | X | X | C | ○ |
| 10 | 576 | 0.8 | 1.5 | 40 | 10 | ○ | X | X | C | ○ |
| 11 | 580 | 0.8 | 1 | 46 | 13 | ○ | X | X | C | ○ |
| 12 | 610 | 0.6 | 3 | 5 | 20 | ○ | X | X | D | ○ |

C. Ex.: Comparative Example

As obvious from Tables 1 and 2 above, the curable compositions of the present invention comprising a silyl monomer and/or an isocyanate monomer and an amine compound in an amount within the range of the present invention had excellent adhesion to the substrate (lens) and to the hard coat material. Further, in Examples in which the amount of the silyl monomer and/or isocyanate monomer was 0.5 to 20 wt % based on the total of all the polymerizable monomers, adhesion and scratch resistance were higher than Example 2 or 16 in which the amount of the silyl monomer and/or isocyanate monomer was smaller than those of the above Examples. The color development intensity, fading speed and durability of the photochromic compound were higher than in Example 6 or 18 in which the amount was relatively large at 30 wt %. The scratch resistance was higher when a silyl monomer was used than when an isocyanate monomer was used (Examples 16, 17 and 18). As understood from comparison between Example 25 and other Examples, when an epoxy-based monomer is contained as a polymerizable monomer, adhesion to the substrate (lens) and scratch resistance can be improved and photochromic properties can be made excellent.

As shown in Tables 3 and 4, in Comparative Example 1 to 3 and 6 to 11 in which a silyl monomer and/or an isocyanate monomer or amine compound was not contained or both of them were not contained, adhesion to the substrate (lens) and the hard coat material was extremely low.

When the amount of the amine compound was below the range of the present invention as shown in Comparative Example 4, adhesion to the substrate (lens) was poor and when the amount of the amine compound was above the range of the present invention as shown in Comparative Example 5, adhesion to the substrate (lens) and to the hard coat material was also extremely low. Further, in Comparative Example 5, the initial discoloration of the lens was stronger (larger YI) than other Examples and Comparative Examples in which the same photochromic compound (chromene 1) was used.

Examples 26 to 29

Samples were prepared in the same manner as in Example 1 except that plastic lenses shown in Table 5 were used in place of the CR39 allyl-based resin plastic lens as an optical substrate, and their physical properties were measured. The results are shown in Table 6.

TABLE 5

| Ex. No. | Optical substrate | Silyl monomer/ isocyanate monomer (parts by weight) | other radically polymerizable monomers (parts by weight) | amine compound (parts) | polymerization initiator (parts) | stabilizer (parts) | chromene compound (parts) | viscosity at 25° C. (cp) |
|---|---|---|---|---|---|---|---|---|
| 26 | MR | TMSiMA 5 | TMPT/BPE/U6A/9GA/GMA 20/35/10/20/10 | NMDEA 5 | CGI184/CGI403 0.4/0.1 | LS765 5 | chromene 1 3 | 81 |
| 27 | TE | TMSiMA 5 | TMPT/BPE/U6A/9GA/GMA 20/35/10/20/10 | NMDEA 5 | CGI184/CGI403 0.4/0.1 | LS765 5 | chromene 1 3 | 81 |
| 28 | PC | TMSiMA 5 | TMPT/BPE/U6A/9GA/GMA 20/35/10/20/10 | NMDEA 5 | CGI184/CGI403 0.4/0.1 | LS765 5 | chromene 1 3 | 81 |
| 29 | SPL | TMSiMA 5 | TMPT/BPE/U6A/9GA/GMA 20/35/10/20/10 | NMDEA 5 | CGI184/CGI403 0.4/0.1 | LS765 5 | chromene 1 3 | 81 |

Ex.: Example

TABLE 6

| Ex. No. | λmax (nm) | Color development intensity | fading speed (min) | durability (%) | yellowness YI | color development uniformity | adhesion 1 (substrate) | film thickness (μm) | adhesion 2 (hard coat) | scratch resistance | dissolution into hard coat solution |
|---|---|---|---|---|---|---|---|---|---|---|---|
| 26 | 610 | 0.78 | 1.2 | 45 | 13 | ○ | ○ | 30 | ○ | A | ○ |
| 27 | 610 | 0.7 | 1.2 | 40 | 15 | ○ | ○ | 30 | ○ | A | ○ |
| 28 | 610 | 0.77 | 1.2 | 45 | 13 | ○ | ○ | 30 | ○ | A | ○ |
| 29 | 610 | 0.78 | 1.2 | 45 | 13 | ○ | ○ | 30 | ○ | A | ○ |

Ex. Example

As shown in Tables 5 and 6, the curable compositions of the present invention showed extremely excellent adhesion to the substrate regardless of its type and was excellent in other physical properties.

Examples 30 to 36

Curable compositions which differed in viscosity were prepared using polymerizable monomers shown in Table 7, and the physical properties of the compositions were measured in the same manner as in Example 1. The results are shown in Table 8.

TABLE 7

| Ex. No. | Silyl monomer/ isocyanate monomer (parts by weight) | other radically polymerizable monomers (parts by weight) | amine compound (parts) | polymerization initiator (parts) | stabilizer (parts) | chromene compound (parts) | viscosity at 25° C. (cp) |
|---|---|---|---|---|---|---|---|
| 30 | TMSiMA 5 | TMPT/BPE oligo/9GA/GMA 20/45/20/10 | NMDEA 5 | CGI184/CGI403 0.4/0.1 | LS765 5 | chromene 1 3 | 50 |
| 31 | TMSiMA 5 | TMPT/BPE oligo/EB6A/9GA/GMA 20/35/15/15/10 | NMDEA 5 | CGI184/CGI403 0.4/0.1 | LS765 5 | chromene 1 3 | 105 |
| 32 | TMSiMA 5 | TMPT/BPE oligo/EB6A/9GA/GMA 20/35/20/10/10 | NMDEA 5 | CGI184/CGI403 0.4/0.1 | LS765 5 | chromene 1 3 | 140 |
| 33 | TMSiMA 5 | TMPT/BPE oligo/EB6A/GMA 20/35/40/10 | NMDEA 5 | CGI184/CGI403 0.4/0.1 | LS765 5 | chromene 1 3 | 320 |
| 34 | TMSiMA 5 | TMPT/BPE oligo/9GA/GMA 20/45/20/10 | NMDEA 5 | CGI184/CGI403 0.4/0.1 | LS765 5 | chromene 1 3 | 35 |
| 35 | TMSiMA 5 | 3G/GMA 80/20 | NMDEA 5 | CGI184/CGI403 0.4/0.1 | LS765 5 | chromene 1 3 | 10 |
| 36 | TMSiMA 5 | BPE oligo/EB6A/GMA 40/45/10 | NMDEA 5 | CGI184/CGI403 0.4/0.1 | LS765 5 | chromene 1 3 | 2000 |

Ex.: Example

TABLE 8

| Ex. No. | λmax (nm) | Color development intensity | fading speed (min) | durability (%) | yellowness YI | color development uniformity | adhesion 1 (substrate) | film thickness (μm) | adhesion 2 (hard coat) | scratch resistance | dissolution into hard coat solution |
|---|---|---|---|---|---|---|---|---|---|---|---|
| 30 | 610 | 1 | 0.8 | 26 | 12 | ○ | ○ | 18 | ○ | A | ○ |
| 31 | 610 | 0.9 | 1.2 | 48 | 14 | ○ | ○ | 42 | ○ | A | ○ |
| 32 | 610 | 0.9 | 1.4 | 52 | 17 | ○ | ○ | 48 | ○ | A | ○ |
| 33 | 610 | 0.9 | 1.6 | 56 | 20 | ○ | ○ | 55 | ○ | A | ○ |
| 34 | 610 | 0.55 | 1.5 | 20 | 10 | ○ | ○ | 13 | ○ | A | ○ |
| 35 | 610 | 0.1 | 0.8 | 2 | 5 | X | ○ | 1~3 | ○ | A | ○ |
| 36 | 610 | 1.3 | 1.2 | 67 | 35 | X | ○ | 130~300 | ○ | A | ○ |

Ex. Example

As shown in Tables 7 and 8 above, the curable compositions of the present invention showed excellent adhesion regardless of their viscosities. Further, the thickness of the obtained coating layers could be easily adjusted to 10 to 100 μm and made uniform by controlling the viscosity at 25° C. to 20 to 50 cp. Thereby, photochromic materials which were free from color development nonuniformity upon exposure and developed color uniformly from the entire surface of the lens could be obtained. It is considered that color development nonuniformity caused by a small difference in film thickness can be ignored by adjusting the thickness of a coating film to a value larger than the predetermined value and that a uniform film can be formed by spin coating when the viscosity of the curable composition is made relatively small to adjust the thickness of the coating film to a value smaller than the predetermined value.

Further, as understood from the results of examples and comparison between examples in which the type and amount of the silyl monomer and the type of the chromene compound are the same, it is easy to adjust the thickness of the obtained coating layer to 20 μm or more by controlling the viscosity of the curable composition of the present invention to 60 cp or more, thereby making it possible to further improve the durability of the photochromic compound (for example, Examples 1, 7 to 15, 31 to 33, comparison between Examples 30 and 34). Similarly, it is easy to adjust the thickness of the coating layer to 50 μm or less by controlling the viscosity of the curable composition to 200 cp or less, thereby making it possible to further reduce the initial yellowness (for example, Examples 1, 7 to 15, 31, 32 and 33).

Comparative Example 13

90 g of hydroxyethyl methacrylate, 150 parts by weight of butyl acrylate, 60 parts by weight of styrene, 160 parts by weight of a high-boiling aromatic solvent (Aromatic 100 of Texaco Co., Ltd.) and 11 parts by weight of the Luperox 555-M60 thermopolymerization initiator (t-amyl peracetate of Elf Atochem Co., Ltd.) were added to a vessel whose inside had been substituted by nitrogen and polymerized at 125° C. for 3 hours. As a result, a polymer solution having a solid content of 65% was obtained. When the weight average molecular weight of this polymer was measured by GPC (Gel Permeation Chromatography), it was 13,500.

28 parts by weight of the polymer solution obtained above, 11 parts by weight of poly(oxytetramethylene)diol having a number average molecular weight of 1,000, 21 parts by weight of N-methylpyrrolidone, 40 parts by weight of polyisocyanate (VestanatB1358 ABlocked of Huls America Co., Ltd., aliphatic polyisocyanate capped by methyl-ethyl ketoxime), 3 parts by weight of chromene 1 as a photochromic compound and 5 parts by weight of dibutyltin dilaurate as a polymerization catalyst were added and fully dissolved by agitation. Thereafter, about 0.8 g of this mixed solution was applied to the surface of a 2 mm-thick plastic lens (CR39) with a spin coater in the same manner as in Example 1 and spin coated at a revolution of 2,000 rpm. This coating film was exposed to infrared radiation to be pre-cured and then heated at 140° C. for 40 minutes to be post-cured.

The obtained lens having a photochromic coating layer was used as a sample and its physical properties were measured in the same manner as in Example 1. The results are shown in Table 9.

TABLE 9

| C. Ex. No. | λmax (nm) | Color development intensity | fading speed (min) | durability (%) | yellowness YI | adhesion (substrate) | adhesion (hard coat) | scratch resistance | dissolution into hard coat solution |
|---|---|---|---|---|---|---|---|---|---|
| 13 | 610 | 0.35 | 4 | 30 | 16 | X | X | D | X |

C. Ex.: Comparative Example

As understood from the results of Comparative Example 13 shown in Table 9 above and comparison with the above Examples, when not radically polymerizable monomers but a mixture of a radical polymer and a monomer having an urethane bond was used as components of a coating material, adhesion to both the substrate (lens) and the hard coat was poor and the dissolution of a photochromic compound was seen at the time of hard coating. Therefore, this material was not preferred as a coating material.

Photochromic coating compositions used in Examples 37 to 69 and Comparative Examples 14 to 16 are given below. The following methods were used to measure adhesion between a lens and a photochromic layer and the thickness of the photochromic layer but other evaluations were the same as in Examples 1 to 36.

Coating Composition A:

A photochromic coating composition A was obtained by adding and fully mixing 3 parts by mass of chromene 1, 5 parts by mass of N-methyldiethanolamine, 5 parts by mass of LS765, and 0.4 part by mass of CGI184 and 0.1 part by mass of CGI403 as polymerization initiators to 100 parts by mass of polymerizable monomers consisting of 5 parts by mass of γ-methacryloyloxypropyl trimethoxysilane, 20 parts by mass of trimethylolpropane trimethacrylate, 35 parts by mass of 2,2-bis(4-methacryloyloxyethoxyphenyl)propane, 10 parts by mass of polyester oligomer hexaacrylate, 20 parts of polyethylene glycol diacrylate having an average molecular weight of 532 and 10 parts of glycidyl methacrylate.

Coating Compositions B to R:

Coating compositions B to R were obtained by mixing together components shown in Table 10 in the same manner as the coating composition A.

plasma treatment using an atmospheric plasma irradiation device (ST-7000 of Keyence Co., Ltd.) for a total of 90 seconds. The distance between an irradiation unit and the lens was about 10 mm and a SUS mesh sheet was inserted between the irradiation unit and the lens. Air obtained from a commercially available air cylinder was used as introduction gas for the plasma treatment. When the relative humidity of the air supplied from the air cylinder was measured, it was 14% at 24° C. (using the TR-72S temperature and humidity meter of Iuchi Seieido Co., Ltd.).

Subsequently, the surface of the lens subjected to the atmospheric plasma treatment by the above method was spin

TABLE 10

| Comp. No. | Silyl monomer/ isocyanate monomer (parts by weight) | other radically polymerizable monomers (parts by weight) | amine compound (parts) | polymerization initiator (parts) | Stabilizer (parts) | chromene compound (parts) |
|---|---|---|---|---|---|---|
| A | TMSiMA 5 | TMPT/BPE/EB6A/9GA/GMA 20/35/10/20/10 | NMDEA 5 | CGI184/CGI403 0.4/0.1 | LS765 5 | chromene 1 3 |
| B | TMSiMA 5 | TMPT/BPE/U6A/9GA/GMA 20/35/10/20/10 | NMDEA 1 | CGI184/CGI403 0.4/0.1 | LS765 5 | chromene 1 3 |
| C | TMSiMA 5 | DPEHA/BPE/U6A/9GA/GMA 20/35/10/20/10 | NMDEA 10 | CGI184/CGI403 0.4/0.1 | LS765 5 | chromene 1 3 |
| D | TMSiMA 5 | TMPT/BPE oligo/EB6A/9GA/GMA 20/35/10/20/10 | NMDEA 5 | CGI184/CGI403 0.4/0.1 | LS765 5 | chromene 4 3 |
| E | MOI 5 | TMPT/BPE/U6A/MePEGMA/GMA 20/35/10/20/10 | DMEMA 5 | CGI184/CGI403 0.4/0.1 | LS765 5 | chromene 1 3 |
| F | TMSiMA 10 | TMPT/BPE/U6A/9GA/GMA 20/30/10/20/10 | NMDEA 5 | CGI184/CGI403 0.4/0.1 | LS765 5 | chromene 1 3 |
| G | TMSiMA 20 | TMPT/BPE/EB6A/9GA/GMA 15/20/15/20/10 | NMDEA 5 | CGI184/CGI403 0.4/0.1 | LS765 5 | chromene 1 3 |
| H | TMSiMA 5 | TMPT/BPE/U6A/9GA/GMA 20/35/10/20/10 | NMDEA 5 | CGI184/CGI403 0.4/0.1 | LS765 5 | chromene 1 3 |
| I | TMSiMA 5 | TMPT/BPE/U6A/9GA/GMA 20/35/10/20/10 | DMEMA 5 | CGI184/CGI403 0.4/0.1 | LS765 5 | chromene 1 3 |
| J | TMSiMA 5 | TMPT/BPE/EB6A/9GA/GMA 20/35/10/20/10 | NMDEA 5 | CGI184/CGI403 0.4/0.1 | LS765 5 | chromene 3 3 |
| K | TMSiMA 5 | DPEHA/BPE oligo/EB6A/9GA/GMA 20/35/10/20/10 | NMDEA 5 | CGI184/CGI403 0.4/0.1 | LS765 5 | chromene 5 3 |
| L | TMSiMA/MOI 3/2 | TMPT/BPE/U6A/MePEGMA/GMA 20/35/10/20/10 | NMDEA 5 | CGI184/CGI403 0.4/0.1 | LS765 5 | chromene 6 3 |
| M | TMSiMA 1 | TMPT/BPE/U6A/9GA/GMA 20/39/10/20/10 | NMDEA 5 | CGI184/CGI403 0.4/0.1 | LS765 5 | chromene 1 3 |
| N | TMSiMA 5 | TMPT/BPE/U6A/9GA/GMA 20/35/10/20/10 | DMEMA 20 | CGI184/CGI403 0.4/0.1 | LS765 5 | chromene 2 3 |
| O | TMSiMA 5 | TMPT/BPE/U6A/MePEGMA/GMA 20/35/10/20/10 | NMDEA 5 | CGI184/CGI403 0.4/0.1 | LS765 5 | chromene 2 3 |
| P | TMSiMA 5 | TMPT/BPE/EB6A/9GA/GMA 25/30/10/20/10 | NMDEA 5 | CGI184/CGI403 0.4/0.1 | LS765 5 | chromene 1 3 |
| Q | — | TMPT/BPE/U6A/9GA/GMA 20/40/10/20/10 | NMDEA 5 | CGI184/CGI403 0.4/0.1 | LS765 5 | chromene 1 3 |
| R | TMSiMA 5 | TMPT/BPE/U6A/9GA/GMA 20/35/10/20/10 | — | CGI184/CGI403 0.4/0.1 | LS765 5 | chromene 1 3 |

Comp.: Coating Composition

(12) adhesion between lens and photochromic layer: The photochromic layer formed surface of a lens having a photochromic coating layer was cut in 100 1 mm×1 mm squares with a sharp cutter knife, and commercially available Cellotape (registered trademark) was affixed to the surface and stripped quickly to check the stripping of the photochromic layer visually. The evaluation (number of remaining squares after evaluation/number of squares before evaluation) was made based on 5 criteria. That is, ⊚ indicates 100/100, ○ 95/100 or more, Δ 80/100 or more, ▼ 50/100 or more, and X less than 50/100

(13) thickness of photochromic layer: measured using the thin film measuring instrument of Filmetrics Co., Ltd.

Example 37

The entire convex surface of a 2 mm-thick plastic lens (resin substrate: CR39) was subjected to an atmospheric coated with the coating composition A by the 1H-DX2 spin coater of MIKASA Co., Ltd. at a revolution of 60 rpm for 40 seconds, 500 rpm for 2 seconds and 1,000 rpm for 2 seconds. This lens coated with the coating composition was exposed by a metal halide lamp at an irradiation intensity of about 120 mW/cm$^2$ in a nitrogen gas atmosphere for 2 minutes to cure the coating composition. The lens was further heated at 120° C. for 3 hours.

The obtained photochromic optical material was used as a sample to measure its maximum absorption wavelength, color development intensity, fading speed, durability, yellowness, adhesion between the lens and the photochromic layer and the thickness of the photochromic layer by the following methods. The results are shown in Table 11.

Examples 38 and 39

Materials were prepared and evaluated in the same manner as in Example 37 except that air obtained by compressing the ambient air or nitrogen gas supplied from a commercially available nitrogen cylinder was used in place of air supplied from the commercially available air cylinder. The evaluation results are shown in Table 11.

Comparative Examples 14 to 16

Photochromic optical materials were obtained in the same manner as in Example 37 except that the surface of the lens was not treated (Comparative Example 14), the lens was immersed in a 10 mass % aqueous solution of NaOH at 25° C. for 15 minutes and then rinsed with water (Comparative Example 15) or the lens was immersed in a 10 mass % aqueous solution of $H_2SO_4$ at 25° C. for 30 minutes and rinsed with water (Comparative Example 16) in place of the atmospheric plasma treatment. The results are shown in Table 11.

with the coating composition was exposed by a metal halide lamp at an irradiation intensity of about 120 mW/cm in a nitrogen gas atmosphere for 2 minutes to cure the coating composition. The lens was further heated at 120° C. for 3 hours.

The obtained photochromic optical material was used as a sample to measure its maximum absorption wavelength, color development intensity, fading speed, durability, yellowness, adhesion between the lens and the photochromic layer and the thickness of the photochromic layer by the same methods as in Example 37. The results are shown in Table 13.

Examples 41 to 65

Photochromic optical materials were produced in the same manner as in Example 40 under atmospheric plasma treatment and cleaning conditions shown in Table 12 and their characteristic properties were evaluated. The results are shown in Table 13.

As for cleaning methods shown in Table 12, "wipe cleaning" is a method for cleaning the surface of a resin

TABLE 11

| No. | Surface treatment method | introduction gas | relative humidity (RH %:24° C.) | plasma treatment time (sec) | coating | λmax (nm) | color development intensity | fading speed (min) | durability (%) | adhesion (substrate) | film thickness (μm) |
|---|---|---|---|---|---|---|---|---|---|---|---|
| Ex. 37 | Atmospheric plasma | air cylinder | 14 | 90 | A | 610 | 0.81 | 1.1 | 43 | ○ | 32 |
| Ex. 38 | Atmospheric plasma | Compressed air | 25 | 90 | A | 610 | 0.80 | 1.1 | 43 | ○ | 32 |
| Ex. 39 | Atmospheric plasma | Nitrogen cylinder | 14 | 90 | A | 610 | 0.81 | 1.2 | 43 | ○ | 32 |
| C. Ex. 14 | Untreated | — | — | — | A | 610 | 0.75 | 1.1 | 39 | X | 32 |
| C. Ex. 15 | NaOH aqueous solution | — | — | — | A | 610 | 0.77 | 1.2 | 37 | X | 30 |
| C. Ex. 16 | $H_2SO_4$ aqueous solution | — | — | — | A | 610 | 0.8 | 1.1 | 40 | X | 34 |

Ex.: Example
C. Ex.: Comparative Example

Example 40

The entire convex surface of a 2 mm-thick plastic lens (resin substrate: CR39) was subjected to an atmospheric plasma treatment using an atmospheric plasma irradiation device (ST-7000 of Keyence Co., Ltd.) for a total of 90 seconds. The distance between an irradiation unit and the lens was about 10 mm and a commercially available air cylinder was used as introduction gas for the plasma treatment. When the relative humidity of air supplied from the air cylinder was measured, it was 14% at 24° C. (using the TR-72S temperature and humidity meter of Iuchi Seieido Co., Ltd.).

The lens subjected to the plasma treatment by the above method was set in the 1H-DX2 spin coater of MIKASA Co., Ltd. and spin cleaned with 3 ml of distilled water heated at about 40° C. The spin conditions at this point were 60 rpm for 20 seconds, 500 rpm for 2 seconds and 2,000 rpm for 10 seconds.

Subsequently, the surface of the lens subjected to the atmospheric plasma treatment by the above method and cleaned with distilled water was spin coated with the coating composition A using the 1H-DX2 spin coater of MIKASA Co., Ltd. at a revolution of 60 rpm for 40 seconds, 500 rpm for 2 seconds and 1,000 rpm for 2 seconds. This lens coated substrate subjected to an atmospheric plasma treatment by wiping with cloth imbibed with a suitable amount of water or an organic solvent containing water, "ultrasonic cleaning" is a method for cleaning a resin substrate subjected to an atmospheric plasma treatment with ultrasonic waves by immersing it in water or an organic solvent containing water in a vessel, and "spin cleaning" is a method for cleaning a resin substrate subjected to an atmospheric plasma treatment by setting it in a spin coating device and spinning it after or while a suitable amount of water or an aqueous solvent containing water is applied to the surface of the resin substrate. Further, as for introduction gas, "ordinary air" is untreated air at a place where the atmospheric plasma irradiation device is installed, "compressed air" is air obtained by compressing air by a compressor and let passing the compressed air through a water absorption pipe filled with a suitable amount of a moisture absorbent such as calcium chloride or silica gel to adjust its relative humidity, and "air cylinder" is air obtained from a commercially available air cylinder. As for other introduction gases, gases obtained from commercially available cylinders were used. Distilled water commercially available from Wako Pure Chemical Industries, Ltd. was used as water and commercially available JIS first-grade methanol, JIS first-grade ethanol, JIS special-grade acetone, JIS special-grade acetonitrile and JIS first-grade diethyl ether were directly used as organic solvents.

TABLE 12

| Ex. No. | Surface treatment method | introduction gas | relative humidity (RH %:24° C.) | plasma treatment time (sec) | cleaning solvent (mixing ratio) | amount of cleaning solvent (ml) | temperature of cleaning solvent (° C.) | cleaning time (sec) | cleaning method | coating composition |
|---|---|---|---|---|---|---|---|---|---|---|
| 40 | Atmospheric plasma | air cylinder | 14 | 90 | water | 3 | 40 | 40 | spin cleaning | A |
| 41 | Atmospheric plasma | air cylinder | 14 | 90 | water | 50 | 30 | 120 | ultrasonic cleaning | A |
| 42 | Atmospheric plasma | air cylinder | 14 | 90 | water | 10 | 26 | 60 | wipe cleaning | A |
| 43 | Atmospheric plasma | Ordinary air | 40 | 50 | water | 5 | 45 | 50 | spin cleaning | B |
| 44 | Atmospheric plasma | Nitrogen cylinder | 14 | 90 | water | 3 | 40 | 40 | spin cleaning | C |
| 45 | Atmospheric plasma | Helium cylinder | 14 | 30 | water | 3 | 35 | 50 | spin cleaning | D |
| 46 | Atmospheric plasma | oxygen cylinder | 14 | 80 | water | 40 | 30 | 300 | ultrasonic cleaning | E |
| 47 | Atmospheric plasma | Ordinary air | 90 | 90 | water | 3 | 40 | 40 | spin cleaning | A |
| 48 | Atmospheric plasma | air cylinder | 14 | 90 | water/methanol(75/25) | 3 | 32 | 40 | spin cleaning | A |
| 49 | Atmospheric plasma | air cylinder | 14 | 30 | water/ethanol(95/5) | 15 | 10 | 90 | wipe cleaning | A |
| 50 | Atmospheric plasma | compressed air | 14 | 90 | water/methanol(25/75) | 5 | 25 | 60 | spin cleaning | F |
| 51 | Atmospheric plasma | compressed air | 25 | 20 | water/ethanol(55/45) | 40 | 18 | 90 | ultrasonic cleaning | G |
| 52 | Atmospheric plasma | compressed air | 23 | 60 | water/acetone(80/20) | 15 | 25 | 60 | wipe cleaning | H |
| 53 | Atmospheric plasma | Nitrogen cylinder | 14 | 60 | water/methanol(75/25) | 40 | 25 | 60 | ultrasonic cleaning | J |
| 54 | Atmospheric plasma | Nitrogen cylinder | 14 | 60 | water/acetonitrile(90/10) | 5 | 28 | 60 | spin cleaning | K |
| 55 | Atmospheric plasma | Helium cylinder | 14 | 120 | water/diethyl ether(95/5) | 10 | 25 | 70 | wipe cleaning | K |
| 56 | Atmospheric plasma | argon cylinder | 14 | 60 | water/methanol(15/85) | 5 | 35 | 60 | spin cleaning | L |
| 57 | Atmospheric plasma | air cylinder | 14 | 90 | acetone | 3 | 40 | 40 | spin cleaning | A |
| 58 | Atmospheric plasma | air cylinder | 14 | 90 | methanol | 10 | 40 | 40 | spin cleaning | A |
| 59 | Atmospheric plasma | air cylinder | 14 | 90 | methanol | 50 | 30 | 120 | ultrasonic cleaning | A |
| 60 | Atmospheric plasma | air cylinder | 14 | 90 | methanol | 10 | 26 | 60 | wipe cleaning | A |
| 61 | Atmospheric plasma | air cylinder | 14 | 180 | methanol/ethanol(50/50) | 5 | 30 | 60 | spin cleaning | A |
| 62 | Atmospheric plasma | air cylinder | 14 | 75 | First time: water<br>Second time: methanol | 10<br>10 | 25<br>23 | 60<br>50 | wipe cleaning | M |
| 63 | Atmospheric plasma | air cylinder | 14 | 120 | First time: water<br>Second time: water | 3<br>2 | 25<br>60 | 30<br>50 | spin cleaning | N |
| 64 | Atmospheric plasma | nitrogen cylinder | 14 | 30 | First time: water<br>Second time: acetone | 40<br>40 | 25<br>30 | 50<br>30 | ultrasonic cleaning | O |
| 65 | Atmospheric plasma | oxygen cylinder | 14 | 20 | First time: water/ethanol(80/20)<br>Second time: ethanol | 5<br>2 | 25<br>30 | 50<br>30 | spin cleaning | P |

Ex.: Example

TABLE 13

| Ex. No. | λmax (nm) | Color development intensity | fading speed (min) | durability (%) | adhesion (substrate) | film thickness (μm) |
|---|---|---|---|---|---|---|
| 40 | 610 | 0.78 | 1.1 | 45 | ◎ | 32 |
| 41 | 610 | 0.8 | 1.1 | 45 | ◎ | 33 |
| 42 | 610 | 0.79 | 1.1 | 42 | ◎ | 35 |
| 43 | 610 | 0.82 | 1.2 | 43 | ◎ | 32 |
| 44 | 610 | 0.7 | 1.5 | 42 | ◎ | 38 |
| 45 | 474 | 0.7 | 1.2 | 38 | ◎ | 40 |
| 46 | 610 | 0.8 | 1.0 | 47 | ◎ | 30 |
| 47 | 610 | 0.78 | 1.0 | 42 | ○ | 33 |
| 48 | 610 | 0.81 | 1.0 | 43 | ◎ | 33 |
| 49 | 610 | 0.78 | 1.0 | 45 | ◎ | 35 |
| 50 | 610 | 0.7 | 1.3 | 45 | ◎ | 27 |
| 51 | 610 | 0.65 | 1.8 | 42 | ◎ | 22 |
| 52 | 610 | 0.78 | 1.2 | 40 | ◎ | 30 |
| 53 | 610 | 0.71 | 1.4 | 41 | ◎ | 30 |
| 54 | 588 | 0.7 | 1.4 | 44 | ◎ | 29 |
| 55 | 576 | 0.68 | 1.8 | 36 | ◎ | 37 |
| 56 | 580 | 0.8 | 1.5 | 42 | ○ | 32 |
| 57 | 610 | 0.78 | 1.1 | 42 | ○ | 33 |

TABLE 13-continued

| Ex. No. | λmax (nm) | Color development intensity | fading speed (min) | durability (%) | adhesion (substrate) | film thickness (μm) |
|---|---|---|---|---|---|---|
| 58 | 610 | 0.79 | 1.1 | 45 | ○ | 32 |
| 59 | 610 | 0.81 | 1.0 | 43 | ○ | 33 |
| 60 | 610 | 0.78 | 1.0 | 40 | ○ | 33 |
| 61 | 610 | 0.8 | 1.1 | 44 | ○ | 34 |
| 62 | 610 | 0.8 | 1.1 | 45 | ◎ | 35 |
| 63 | 610 | 0.72 | 1.5 | 43 | ◎ | 38 |
| 64 | 600 | 0.62 | 1.9 | 39 | ◎ | 30 |
| 65 | 600 | 0.63 | 1.6 | 38 | ◎ | 28 |

Ex. Example

As obvious from Tables 10 to 13 above, adhesion between the substrate and the coating composition was much higher when the surface of the resin substrate (plastic lens) was subjected to an atmospheric plasma treatment than other surface treatment methods. Further, as understood from comparison between Examples 57 to 61 and other Examples, when water or a mixed solvent of water and an organic solvent was used as a cleaning solvent, adhesion was improved. It can be understood from comparison between Example 47 and Examples 40 and 41 that adhesion can be improved by adjusting the relative humidity of the introduction gas for the atmospheric plasma treatment to 80% or less.

Examples 66 to 69

Photochromic optical materials were produced in the same manner as in Example 40 except that a thiourethane-based resin plastic lens (MR), thioepoxy-based resin plastic lens (TE), a polycarbonate resin plastic lens (PC) and methacrylic resin plastic lens (SPL) were used in place of the CR39 allyl resin plastic lens as a resin substrate, and their characteristic properties were evaluated. The results are shown in Table 14 and reveal that all of the photochromic optical materials show good results regardless of the type of the substrate resin.

TABLE 14

| Ex. No. | Resin substrate | coating composition | λmax (nm) | color development intensity | fading speed (min) | durability (%) | adhesion (substrate) | film thickness (μm) |
|---|---|---|---|---|---|---|---|---|
| 66 | MR | A | 610 | 0.8 | 1.1 | 42 | ◎ | 34 |
| 67 | TE | A | 610 | 0.81 | 1.1 | 43 | ◎ | 35 |
| 68 | PC | A | 610 | 0.78 | 1.1 | 43 | ◎ | 34 |
| 69 | SPL | A | 610 | 0.81 | 1.0 | 45 | ◎ | 32 |

Ex.: Example

Example 70

A 2 mm-thick plastic lens (resin substrate: MR) was immersed in a 10 mass % aqueous solution of NaOH at 25° C. for 15 minutes, rinsed with water and dried and the entire convex surface of the lens was subjected to an atmospheric plasma treatment using an atmospheric plasma irradiation device (ST-7000 of Keyence Co., Ltd.) for a total of 90 seconds. The distance between the irradiation unit and the lens was about 10 mm. A commercially available nitrogen cylinder was used as the introduction gas for the plasma treatment. When the relative humidity of nitrogen supplied from the nitrogen cylinder was measured, it was 14% at 24° C. (using the TR-72S temperature and humidity meter of Iuchi Seieido Co., Ltd.).

The lens treated by the above method was set in the 1H-DX2 spin coater of MIKASA Co., Ltd. and spin cleaned with 3 ml of distilled water heated at about 40° C. The spin conditions at this point were 60 rpm for 20 seconds, 500 rpm for 2 seconds and 2,000 rpm for 10 seconds.

Subsequently, the surface of the lens subjected to the atmospheric plasma treatment by the above method and cleaned with distilled water was spin coated with a mixed solution which comprised 100 parts by mass of polymerizable monomers consisting of 30 parts by mass of 2,2-bis(4-methacryloyloxyethoxyphenyl)propane, 30 parts by mass of 2,2-bis(4-acryloyloxypolyethylene glycolphenyl)propane having an average molecular weight of 776, 20 parts of polyethylene glycol diacrylate having an average molecular weight of 532 and 20 parts of glycidyl methacrylate, 4 parts by mass of chromene 1, 5 parts by mass of LS765, and 0.4 part by mass of CGI184 and 0.1 part by mass of CGI403 as polymerization initiators as a coating composition using the 1H-DX2 spin coater of MIKASA Co., Ltd. at a revolution of 50 rpm for 40 seconds, 300 rpm for 2 seconds and 600 rpm for 2 seconds. The lens coated with this coating composition was exposed by an electrodeless metal halide lamp (Model F300SQ-6 of Fusion UV Systems Japan Co., Ltd.) at an irradiation intensity of 120 mW/cm$^2$ in a nitrogen gas atmosphere having an oxygen concentration of 0.1% or less for 3 minutes to cure the coating composition. The lens was further heated at 110° C. for 1 hour.

The obtained photochromic optical material was used as a sample and its characteristic properties were evaluated by the same methods as in Example 40. The results are shown in Table 15.

Example 71

A photochromic optical material was obtained in the same manner as in Example 70 except that the coating composition was changed to the following composition, and its characteristic properties were evaluated by the same methods as in Example 40. The results are shown in Table 15.
Coating Composition of Example 71:

This composition was obtained by adding and mixing 2.7 parts by mass of chromene 1, 0.8 part by mass of chromene 4 and 0.6 part by mass of 6-morpholino-3-(4'-piperidinophenyl)-3-phenyl-3H-benzo (f)chromene as chromene compounds, 0.3 part by mass of 1',5'-dimethyl-6"-morpholinodispiro(cyclohexane-1,3'-(3H)indol-2'-(2H),3"-(3H) naphtho(3,2-a)(1,4)oxazine and 0.3 part by mass of 1,3,3-trimethyl-6'-morpholino(spiro-(3H)indol-2-(2H),3'-(3H) naphtho(3,2-a)(1,4)oxazine as spirooxazine compounds, 5 parts by mass of N-methyldiethanolamine as an amine compound, 5 parts by mass of LS765 as a hindered amine compound, and 0.4 part by mass of CGI184 and 0.1 part by mass of CGI403 as polymerization initiators with 100 parts by weight of polymerizable monomers consisting of 5 parts by mass of γ-methacryloyloxypropyl trimethoxysilane, 20 parts by mass of trimethylolpropane trimethacrylate, 35 parts by mass of 2,2-bis(4-methacryloyoxyethoxyphenyl)

propane, 10 parts by mass of polyester oligomer hexaacrylate, 20 parts of polyethylene glycol diacrylate having an average molecular weight of 532 and 10 parts of glycidyl methacrylate under agitation.

Example 72

A photochromic optical material was obtained in the same manner as in Example 70 except that the coating composition was changed to the following composition. Its characteristic properties were evaluated by the same methods as in Example 40. The results are shown in Table 15.
Coating Composition of Example 72:
This composition was obtained by adding and mixing 1.6 parts by mass of chromene 1, 2.4 parts by mass of chromene 4 and 0.2 part by mass of 6-morpholino-3-(4'-piperidinophenyl)-3-phenyl-3H-benzo (f) chromene as chromene compounds, 5 parts by mass of N-methyldiethanolamine as an amine compound, 5 parts by mass of LS765 as a hindered amine compound, and 0.4 part by mass of CGI184 and 0.1 part by mass of CGI403 as polymerization initiators with 100 parts by mass of polymerizable monomers consisting of 5 parts by mass of γ-methacryloyloxypropyl trimethoxysilane, 20 parts by mass of trimethylolpropane trimethacrylate, 35 parts by mass of 2,2-bis(4-methacryloyloxyethoxyphenyl)propane, 10 parts by mass of polyester oligomer hexaacrylate, 20 parts by mass of polyethylene glycol diacrylate having an average molecular weight of 532 and 10 parts by mass of glycidyl methacrylate under agitation.

TABLE 15

| Ex. No. | λmax (nm) | Color development intensity | visual evaluation of tone of developed color | fading speed (min) | durability (%) | adhesion (substrate) | film thickness (μm) |
|---|---|---|---|---|---|---|---|
| 70 | 610 | 0.7 | Blue | 0.9 | 38 | ◎ | 20 |
| 71 | 480 | 0.78 | gray | 1.1 | 48 | ◎ | 41 |
|    | 610 | 0.8 |      |     |    |   |    |
| 72 | 480 | 0.96 | brown | 1.0 | 45 | ◎ | 39 |
|    | 610 | 0.67 |      |     |    |   |    |

Ex.: Example

As described above, a photochromic cured product which has excellent adhesion between a coating layer and a substrate as well as excellent adhesion between the coating layer and a hard coat can be obtained from the curable composition of the present invention. Further, a cured product which has extremely excellent photochromic properties such as high color development intensity, high fading speed and further excellent durability can be obtained by adjusting the amount of a silyl monomer and/or an isocyanate monomer.

Since the curable composition of the present invention has the above excellent characteristic properties, it is extremely useful as a coating material for an optical material such as a spectacle lens.

A photochromic optical material having excellent adhesion between a resin substrate and a photochromic coating layer can be obtained by subjecting the surface of the resin substrate to an atmospheric plasma treatment. Further, the adhesion can be further improved by cleaning the resin substrate with water, an organic solvent, or a mixed solvent of water and an organic solvent after the atmospheric plasma treatment. The photochromic optical material production process of the present invention is extremely useful as a process for providing a photochromic optical material which has excellent photochromic properties and excellent adhesion between a photochromic coating layer and a resin substrate.

The invention claimed is:

1. A curable composition comprising:
(1) 100 parts by weight of radically polymerizable monomers;
(2) 1 to 10 parts by weight of an amine compound represented by the following formula (17)

wherein $R^{06}$ is methyl, $R^{07}$ is a hydroxyl group, $R^{08}$ is a hydrogen atom or a hydroxyl group, A' is an alkylene group having 2 to 6 carbon atoms, and A" is a methylene group when $R^{08}$ is a hydrogen atom, or A" is an alkylene group having 2 to 6 carbon atoms when $R^{08}$ is a hydroxyl group; and (3) 0.01 to 20 parts by weight of a photochromic compound, said radically polymerizable monomers comprising (a) a radically polymerizable monomer having a group which forms a silanol group by hydrolysis, represented by the following formula:

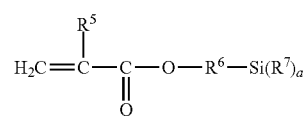

wherein $R^5$ is a hydrogen atom or methyl group, $R^6$ is an alkylene group having 1 to 3 carbon atoms, $R^7$ is an alkoxyl group having 1 to 2 carbon atoms and a is an integer of 3, (b) a radically polymerizable monomer which is selected from the group consisting of glycidyl acrylate and glycidyl methacrylate, (c) a monomer having a homopolymer L-scale Rockwell hardness of 40 or less and represented by the following formula (13):

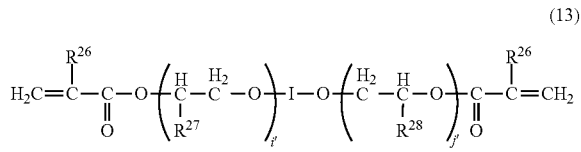

where $R^{26}$ is a hydrogen atom or methyl group, $R^{27}$ and $R^{28}$ are each independently a hydrogen atom or methyl group, I is a divalent organic residual group represented by the following formula:

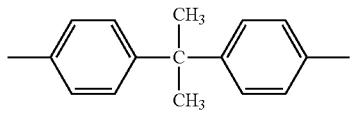

i' and j' are each an integer that ensures that the average value of i'+j' is 9 to 30, and (d) a monomer having a homopolymer L-scale Rockwell hardness of 60 or more and represented by the following formula (7):

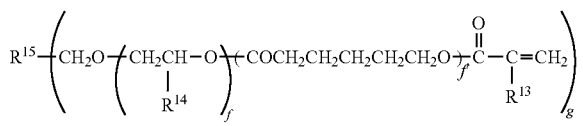

wherein $R^{13}$ is a hydrogen atom or methyl group, $R^{14}$ a hydrogen atom, $R^{15}$ is a tervalent to hexavalent organic residual group having 1 to 16 carbon atoms, f is an integer of 0 to 3, f is an integer of 0 to 1, and g is an integer of 3 to 6, said radically polymerizable monomer (a) being in an amount of 1 to 10 wt % based on the total amount of all the radically polymerizable monomers, said radically polymerizable monomer (b) being in an amount of 0.1 to 20 wt % based on the total of all the radically polymerizable monomers excluding the radically polymerizable monomer (a), said monomer (c) being in an amount of 5 to 70 wt % based on all the radically polymerizable monomers excluding the radically polymerizable monomer (a), and said radically polymerizable monomer (d) being in an amount of 10 to 94.9 wt % based on all the radically polymerizable monomers excluding the radically polymerizable monomer (a), wherein the curable composition has a viscosity at 25° C. of 20 to 500 cp.

2. The curable composition of claim 1, wherein the radically polymerizable monomer (d) is in an amount of 10 to 43 wt % based on all the radically polymerizable monomers excluding the radically polymerizable monomer (a).

3. The curable composition of claim 1 which further comprises a photopolymerization initiator.

4. A photochromic cured product obtained by curing the curable composition of claim 1 or 3.

5. A photochromic optical material comprising a substrate having at least one surface coated with a cured product of the curable composition of claim 1 or 3.

6. The photochromic optical material according to claim 5, wherein the substrate comprises at least one optical material selected from the group consisting of an allylic resin, a methacrylic resin, a polycarbonate resin, a thiourethane resin, a urethane resin and a thioepoxy resin.

7. The photochromic optical material according to claim 5, wherein the substrate comprises at least one optical material selected from the group consisting of an allylic resin, a methacrylic resin, a thiourethane resin, and a thioepoxy resin.

8. The photochromic optical material according to claim 5, wherein
at least one said surface of the substrate has been subjected to a plasma treatment,
the cured product of the curable composition is disposed on the surface of the substrate which has been subjected to the plasma treatment, and
the substrate comprises at least one optical material selected from the group consisting of an allylic resin, a methacrylic resin, a thiourethane resin, and a thioepoxy resin.

9. The photochromic optical material according to claim 5, wherein
at least one said surface of the substrate has been subjected to a plasma treatment,
the cured product of the curable composition is disposed on the surface of the substrate which has been subjected to the plasma treatment, and
the substrate comprises at least one optical material selected from the group consisting of an allylic resin, a thiourethane resin, and a thioepoxy resin.

10. A process for producing a photochromic optical material comprising a substrate having at least one coated surface, the process comprising curing a film of the curable composition of claim 1 or 3 formed on at least one surface of the substrate by light or both light and heat.

11. The curable composition of claim 1, further comprising a radically polymerizable monomer having an isocyanate group.

12. The curable composition of claim 1, wherein the radically polymerizable monomer (a) is at least one silyl monomer selected from the group consisting of γ-methacryloyloxypropyl trimethoxysilane, γ-methacryloyloxypropyl triethoxysilane, (3-acryloxypropyl)trimethoxysilane, methacryloxymethyl triethoxysilane, and methacryloxymethyl trimethoxysilane.

13. The curable composition of claim 1, wherein the radically polymerizable monomer (a) is γ-methacryloyloxypropyl trimethoxysilane.

14. A process for coating, which comprises a step of coating a substrate with a curable composition, wherein
the curable composition comprises:
(1) 100 parts by weight of radically polymerizable monomers;
(2) 1 to 10 parts by weight of an amine compound represented by the following formula (17)

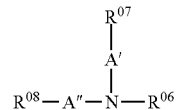

wherein $R^{06}$ is methyl, $R^{07}$ is a hydroxyl group, $R^{08}$ is a hydrogen atom or a hydroxyl group, A' is an alkylene group having 2 to 6 carbon atoms, and A" is a methylene group when $R^{08}$ is a hydrogen atom, or A" is an alkylene group having 2 to 6 carbon atoms when $R^{08}$ is a hydroxyl group; and (3) 0.01 to 20 parts by weight of a photochromic compound, said radically polymerizable monomers comprising (a) a radically polymerizable monomer having a group which forms a silanol group by hydrolysis, represented by the following formula:

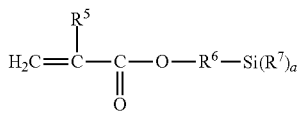

wherein $R^5$ is a hydrogen atom or methyl group, $R^6$ is an alkylene group having 1 to 3 carbon atoms, $R^7$ is an alkoxyl group having 1 to 2 carbon atoms and a is an integer of 3, (b) a radically polymerizable monomer which is selected from the group consisting of glycidyl acrylate and glycidyl methacrylate, (c) a monomer having a homopolymer L-scale Rockwell hardness of 40 or less and represented by the following formula (13):

(13)

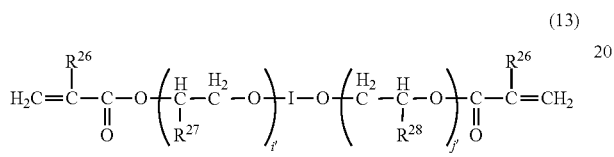

where $R^{26}$ is a hydrogen atom or methyl group, $R^{27}$ and $R^{28}$ are each independently a hydrogen atom or methyl group, I is a divalent organic residual group represented by the following formula:

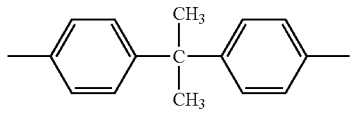

i' and j' are each an integer that ensures that the average value of i'+j' is 9 to 30, and (d) a monomer having a homopolymer L-scale Rockwell hardness of 60 or more and represented by the following formula (7):

(7)

wherein $R^{13}$ is a hydrogen atom or methyl group, $R^{14}$ is a hydrogen atom, $R^{15}$ is a tervalent to hexavalent organic residual group having 1 to 16 carbon atoms, f is an integer of 0 to 3, f' is an integer of 0 to 1, and g is an integer of 3 to 6, said radically polymerizable monomer (a) being in an amount of 1 to 10 wt % based on the total amount of all the radically polymerizable monomers, said radically polymerizable monomer (b) being in an amount of 0.1 to 20 wt % based on the total of all the radically polymerizable monomers excluding the radically polymerizable monomer (a), said monomer (c) being in an amount of 5 to 70 wt % based on all the radically polymerizable monomers excluding the radically polymerizable monomer (a), and said radically polymerizable monomer (d) being in an amount of 10 to 94.9 wt % based on all the radically polymerizable monomers excluding the radically polymerizable monomer (a), wherein the curable composition has a viscosity at 25° C. of 20 to 500 cp.

15. The process of claim 14, wherein the radically polymerizable monomer (d) is in an amount of 10 to 43 wt % based on all the radically polymerizable monomers excluding the radically polymerizable monomer (a).

16. The process for coating of claim 14, wherein the curable composition further comprises a photopolymerization initiator.

* * * * *